(12) United States Patent
Sugita

(10) Patent No.: US 9,575,391 B2
(45) Date of Patent: Feb. 21, 2017

(54) ZOOM LENS AND IMAGE PICKUP APPARATUS INCLUDING THE SAME

(71) Applicant: CANON KABUSHIKI KAISHA, Tokyo (JP)

(72) Inventor: Shigenobu Sugita, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 140 days.

(21) Appl. No.: 14/663,571

(22) Filed: Mar. 20, 2015

(65) Prior Publication Data

US 2015/0277090 A1    Oct. 1, 2015

(30) Foreign Application Priority Data

Mar. 31, 2014 (JP) .................. 2014-072124
Jan. 23, 2015 (JP) .................. 2015-011629

(51) Int. Cl.
*G02B 15/14* (2006.01)
*G03B 3/00* (2006.01)
*G02B 15/173* (2006.01)

(52) U.S. Cl.
CPC ............ *G03B 3/00* (2013.01); *G02B 15/173* (2013.01)

(58) Field of Classification Search
None
See application file for complete search history.

(56) References Cited

FOREIGN PATENT DOCUMENTS

JP    2007-163964 A    6/2007
JP    2010-032702 A    2/2010

*Primary Examiner* — Bumsuk Won
*Assistant Examiner* — Tamara Y Washington
(74) *Attorney, Agent, or Firm* — Carter, DeLuca, Farrell & Schmidt, LLP

(57) ABSTRACT

A zoom lens comprises, in order from an object side to an image side: a first lens unit having a positive refractive power; a second lens unit having a negative refractive power; and a rear unit including at least one lens unit. The intervals between the adjacent lens units vary during zooming. The rear unit has a positive refractive power over the entire zoom range. The second lens unit includes at least three negative lenses, and at least two positive lenses. The materials of all the positive lenses included in the second lens unit are appropriately selected.

24 Claims, 13 Drawing Sheets

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same. In particular, the present invention is suitable for image pickup apparatuses, such as a digital camera, a video camera, a television camera, a monitoring camera and a camera for silver halide photography.

Description of the Related Art

An image pickup optical system included in an image pickup apparatus requires to be a zoom lens that has a small lens total length (the length from a first lens surface to an image plane), high resolution, and a high zoom ratio. To achieve high optical characteristics of such a zoom lens, correction of monochromatic (single wavelength) aberrations, such as spherical aberration and coma, are required to be corrected and, additionally, chromatic aberration is also required to be appropriately corrected. In particular, to achieve high resolution, a telephoto zoom lens that has a high zoom ratio and a long telephoto focal length requires that chromatic aberrations are corrected such that primary achromatism is achieved and furthermore the secondary spectrum is appropriately corrected.

Among zoom lenses having high zoom ratios, what is called a positive lead type zoom lens has been known. In this zoom lens, a lens unit at the most object side has a positive refractive power. Japanese Patent Application Laid-Open No. 2010-32702 discloses a five-unit zoom lens that consists of five lens unit, which are first to fifth lens units, having positive, negative, positive, negative and positive refractive powers in order from the object side to the image side. Japanese Patent Application Laid-Open No. 2007-163964 discloses a five-unit zoom lens that includes an optical element made of a material having abnormal dispersion. The zoom lens disclosed in Japanese Patent Application Laid-Open No. 2007-163964 includes an optical element made of an optical material having high abnormal dispersion, which reduces occurrence of chromatic aberration.

Increase in high zoom ratio in the positive lead type zoom lens increases chromatic aberrations, such as axial chromatic aberration and lateral chromatic aberration, in the entire zoom range. To achieve a high zoom ratio and high optical characteristics over the entire zoom range in the positive lead type zoom lens, reduction in chromatic aberration is important. To reduce chromatic aberration, adoption of a lens made of low dispersion and abnormal dispersion at an appropriate position in the zoom lens is effective.

In particular, it is important for the positive lead type five-unit zoom lens to appropriately adopt the lens configuration of a second lens unit having a negative refractive power for variable magnification, and materials of lenses configuring the second lens unit.

SUMMARY OF THE INVENTION

A zoom lens of the present invention comprises, in order from an object side to an image side: a first lens unit having a positive refractive power; a second lens unit having a negative refractive power; and a rear unit including at least one lens unit, wherein intervals between the adjacent lens units vary during zooming, and wherein the rear unit has a positive refractive power over an entire zoom range, the second lens unit includes at least three negative lenses, and at least two positive lenses, and all the positive lenses included in the second lens unit satisfy a conditional expression, $$1.264+14.3/\nu d < Nd < 1.317+16.667/\nu d,$$

where a refractive index and an Abbe number of a material are Nd and νd, respectively.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Exemplary embodiments of the present invention are hereinafter described with reference to the accompanying drawings. A zoom lens of the present invention includes, in order from an object side to an image side: a first lens unit having a positive refractive power (optical power=reciprocal of focal length); a second lens unit having a negative refractive power; and a rear unit having at least one lens unit. The intervals of adjacent lens units vary during zooming.

The rear unit has a positive refractive power over the entire zoom range. Each of the lens units configuring the zoom lens are separated with reference to variation in interval during zooming. Each lens unit includes one or more lenses.

Figure 1:
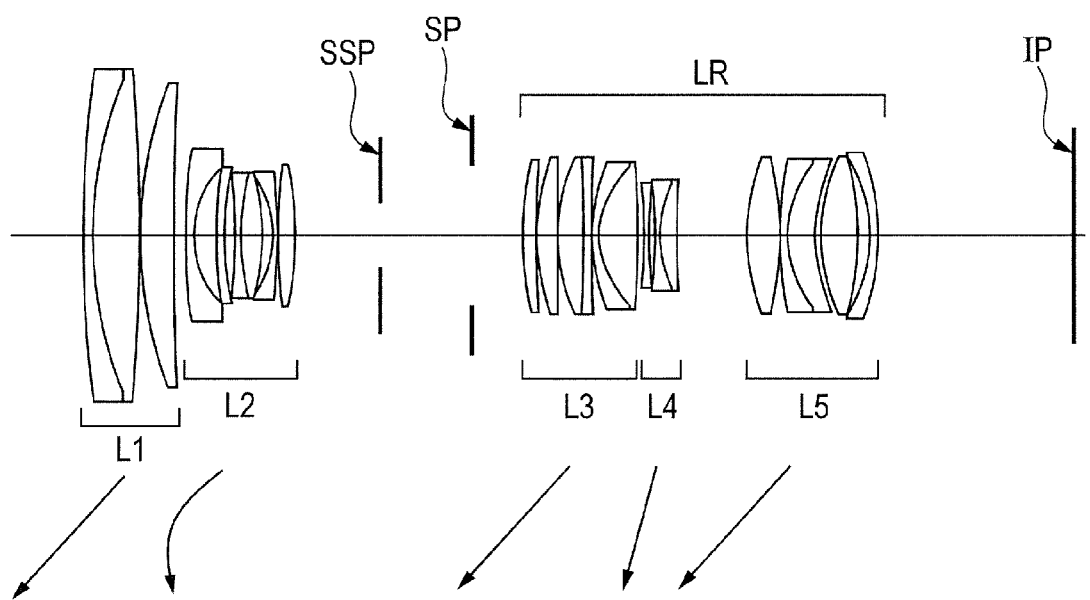
FIG. 1 is a lens sectional view of a zoom lens of Embodiment 1 at the wide angle end.
Figure 2A:
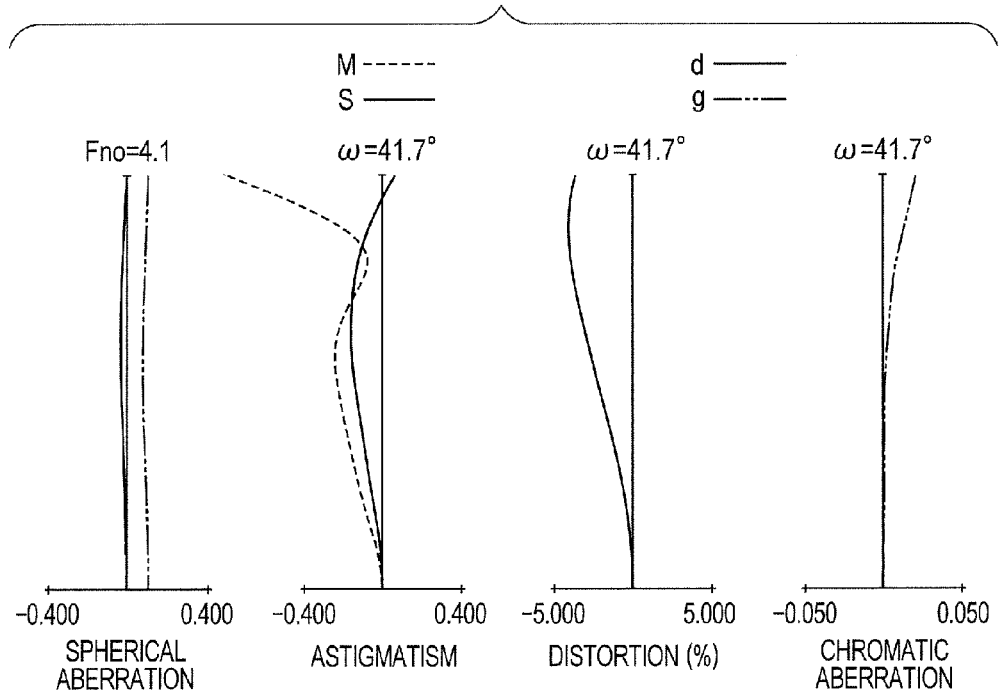
FIG. 2A is an aberration diagram of the zoom lens of Embodiment 1 at the wide angle end.
Figure 2B:
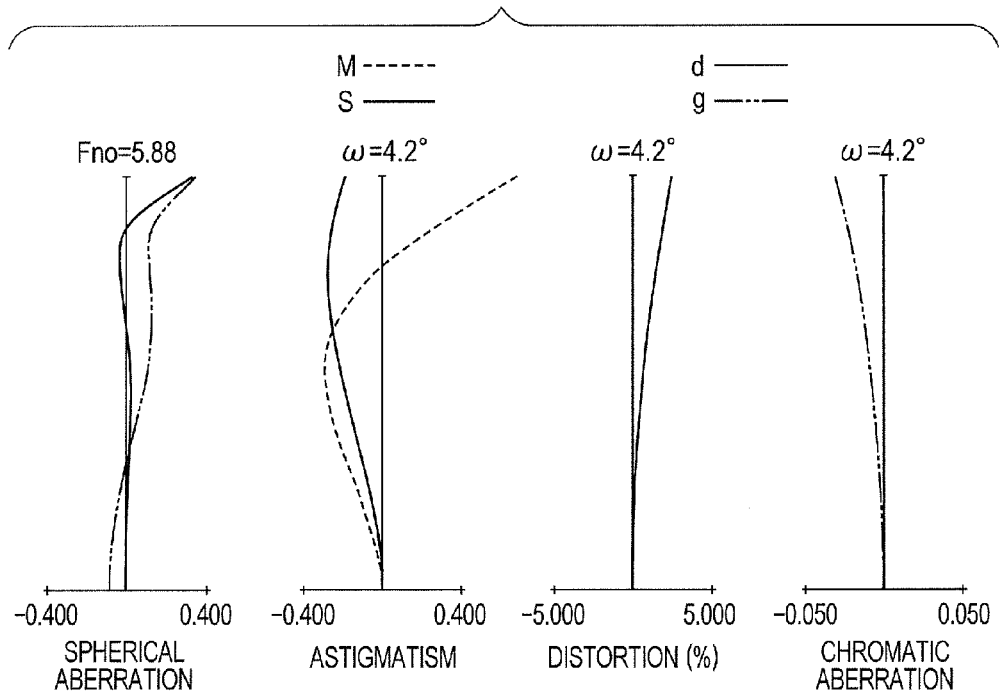
FIG. 2B is an aberration diagram of the zoom lens of Embodiment 1 at the telephoto end.
Figure 3:
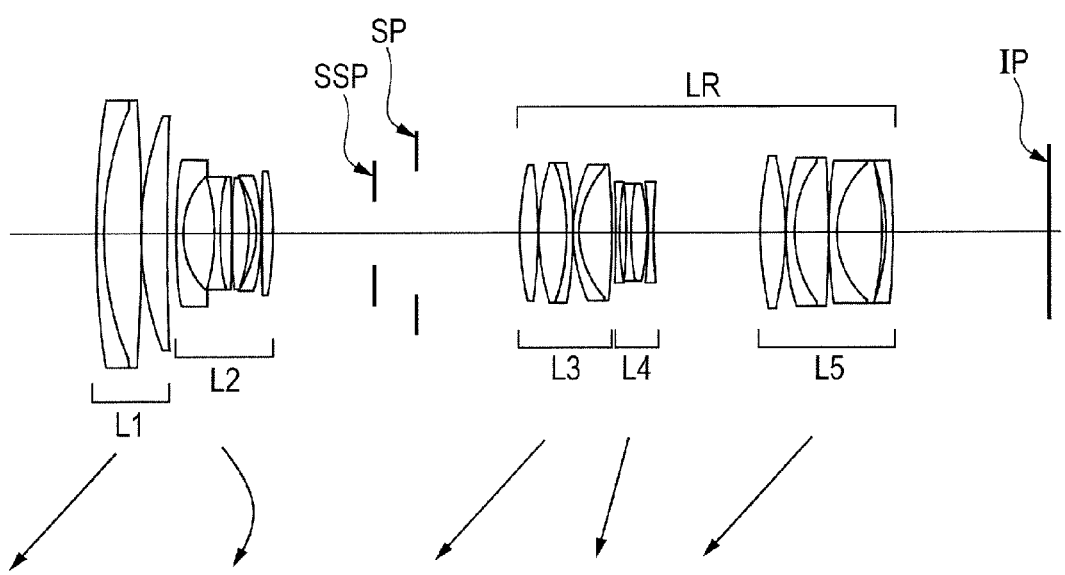
FIG. 3 is a lens sectional view of a zoom lens of Embodiment 2 at the wide angle end.
Figure 4A:
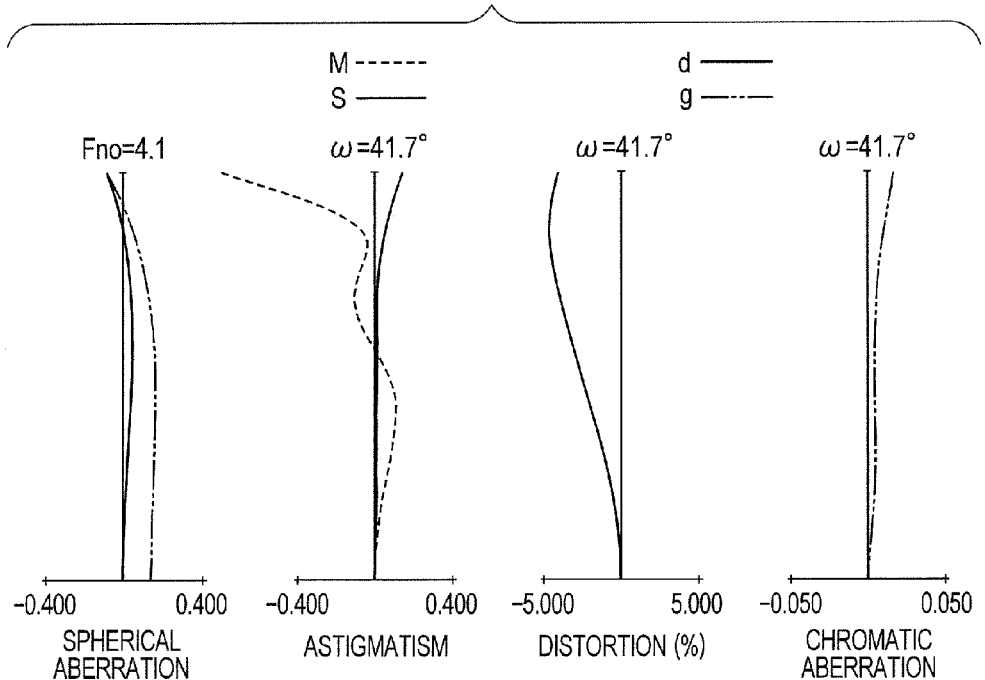
FIG. 4A is an aberration diagram of the zoom lens of Embodiment 2 at the wide angle end.
Figure 4B:
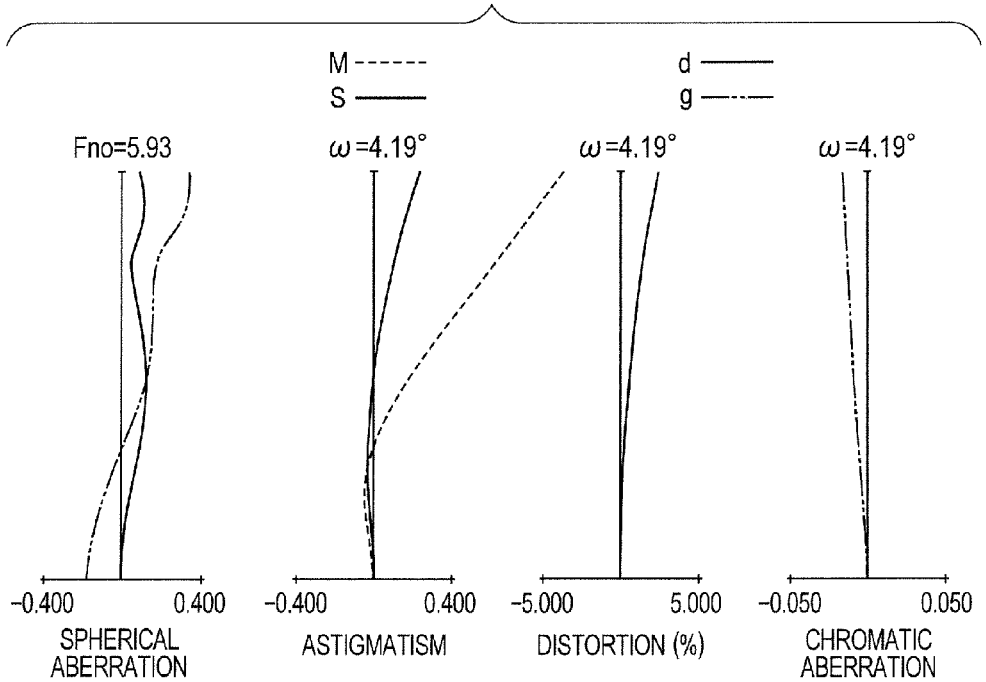
FIG. 4B is an aberration diagram of the zoom lens of Embodiment 2 at the telephoto end.

FIG. 1 is a lens sectional view of zoom lens of Embodiment 1 of the present invention at the wide angle end (short focal length end) during focusing on an object at infinity. FIGS. 2A and 2B are longitudinal aberration diagrams of the zoom lens of Embodiment 1 at the wide angle end and the telephoto end (long focal length end), respectively, during focusing on an object at infinity. FIG. 3 is a lens sectional view of a zoom lens of Embodiment 2 at the wide angle end during focusing at an object at infinity. FIGS. 4A and 4B are longitudinal aberration diagrams of the zoom lens of Embodiment 2 at the wide angle end and the telephoto end, respectively, during focusing on an object at infinity.

Figure 5:
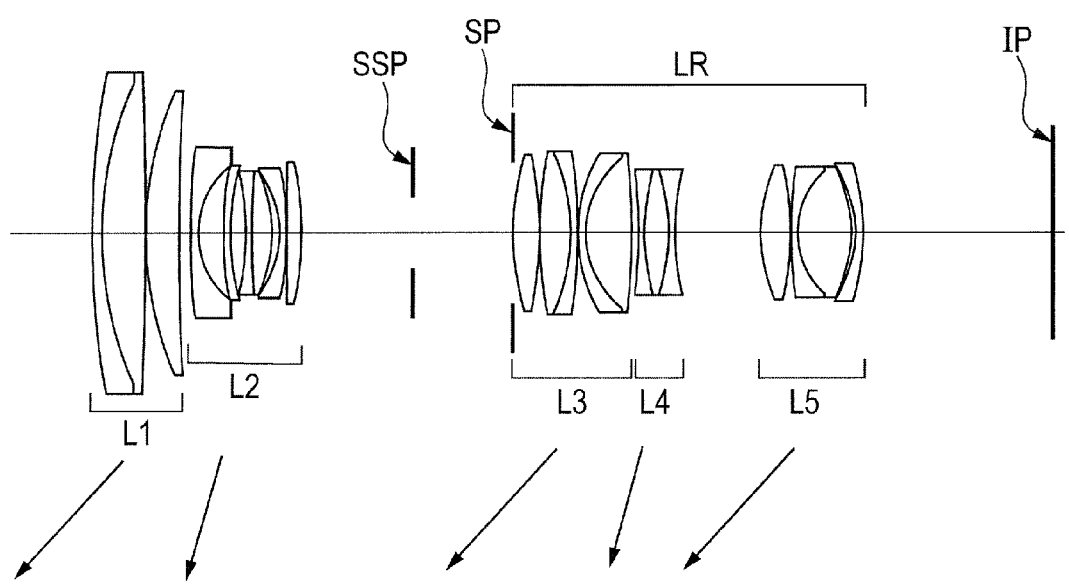
FIG. 5 is a lens sectional view of a zoom lens of Embodiment 3 at the wide angle end.
Figure 6A:
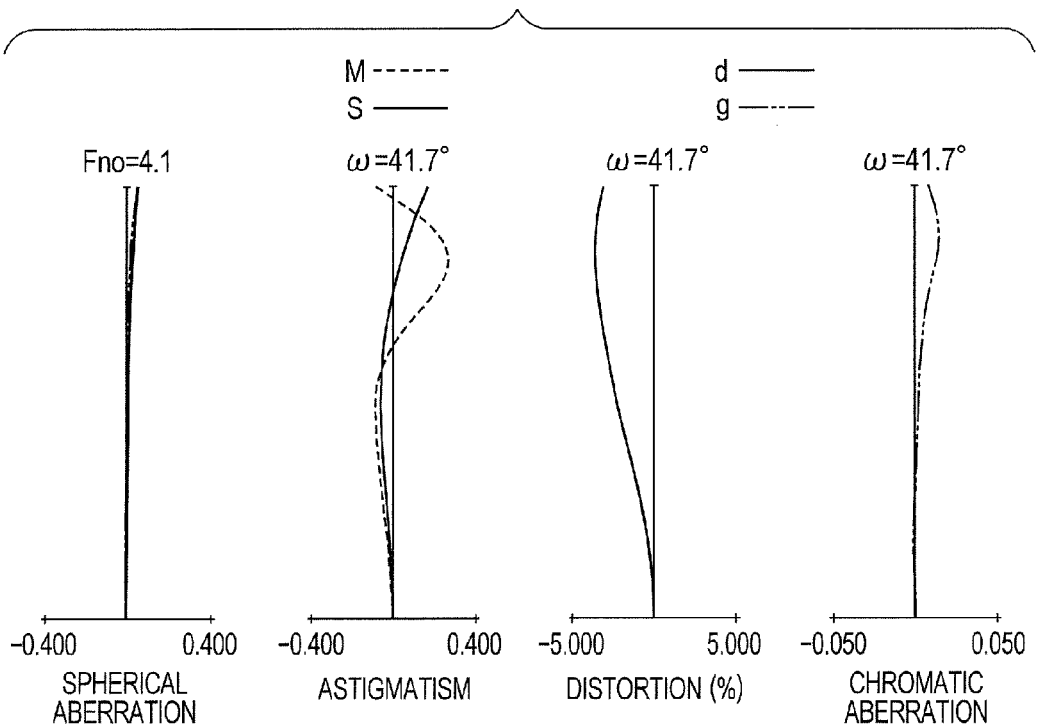
FIG. 6A is an aberration diagram of the zoom lens of Embodiment 3 at the wide angle end.
Figure 6B:
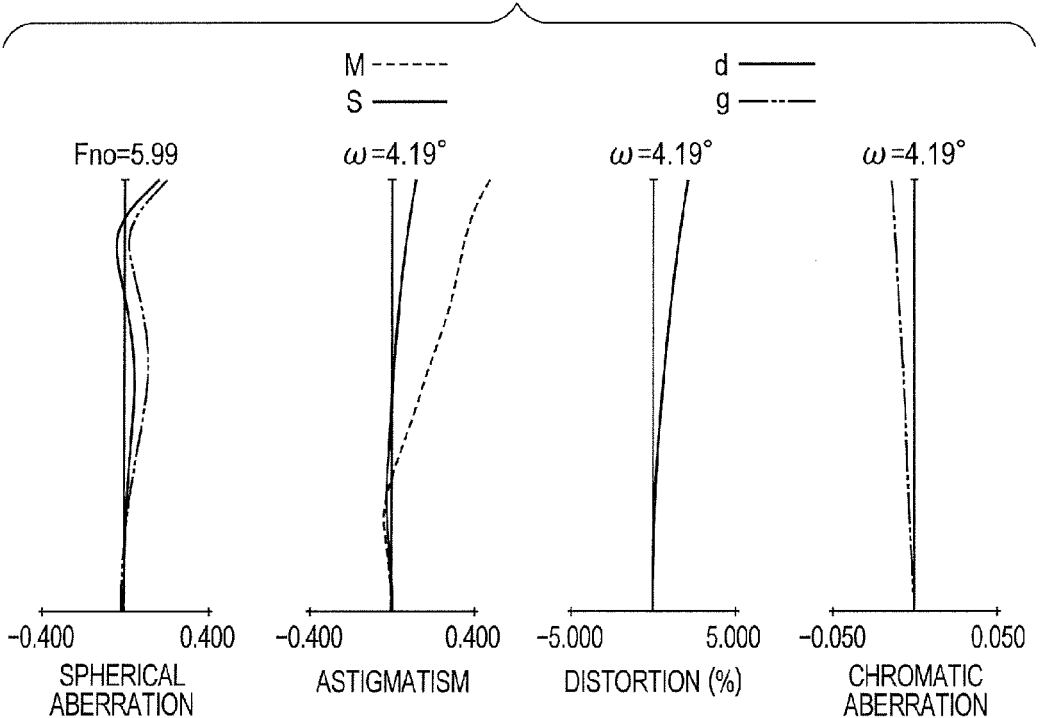
FIG. 6B is an aberration diagram of the zoom lens of Embodiment 3 at the telephoto end.
Figure 7:
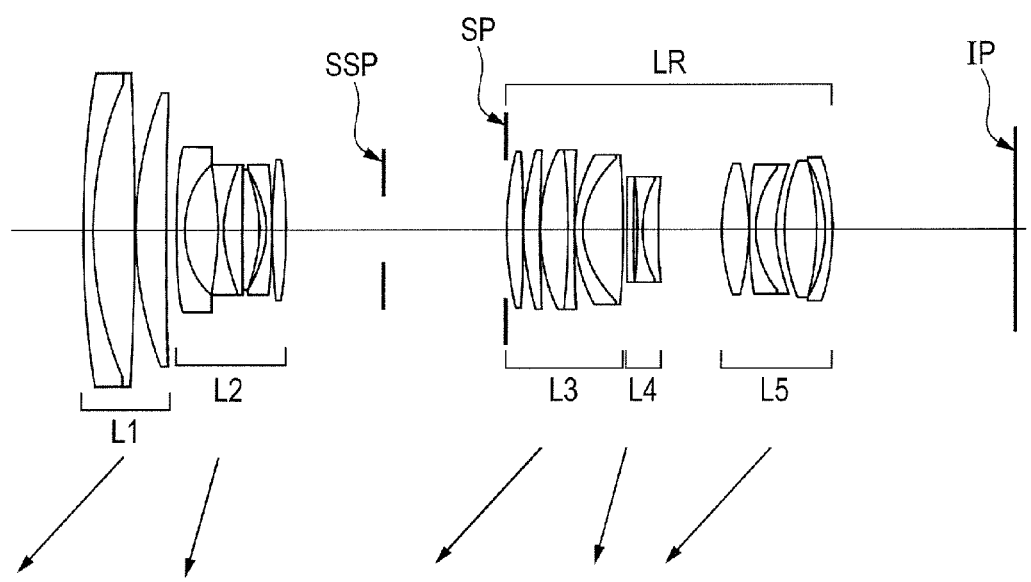
FIG. 7 is a lens sectional view of a zoom lens of Embodiment 4 at the wide angle end.
Figure 8A:
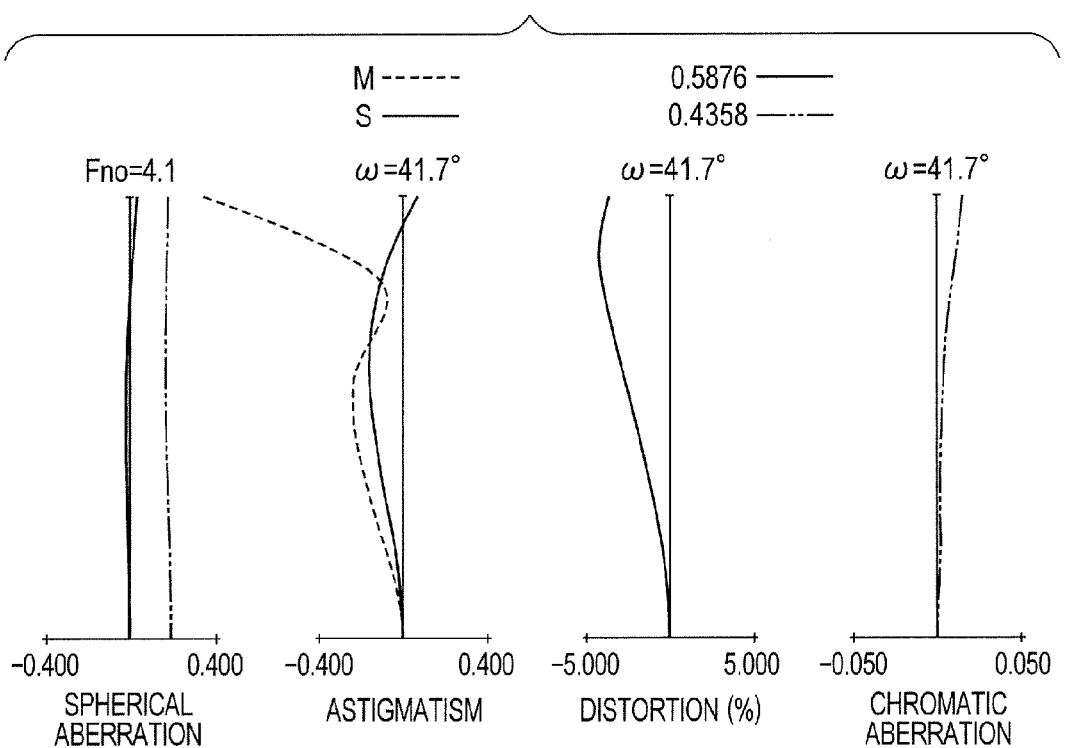
FIG. 8A is an aberration diagram of a zoom lens of Embodiment 4 at the wide angle end.
Figure 8B:
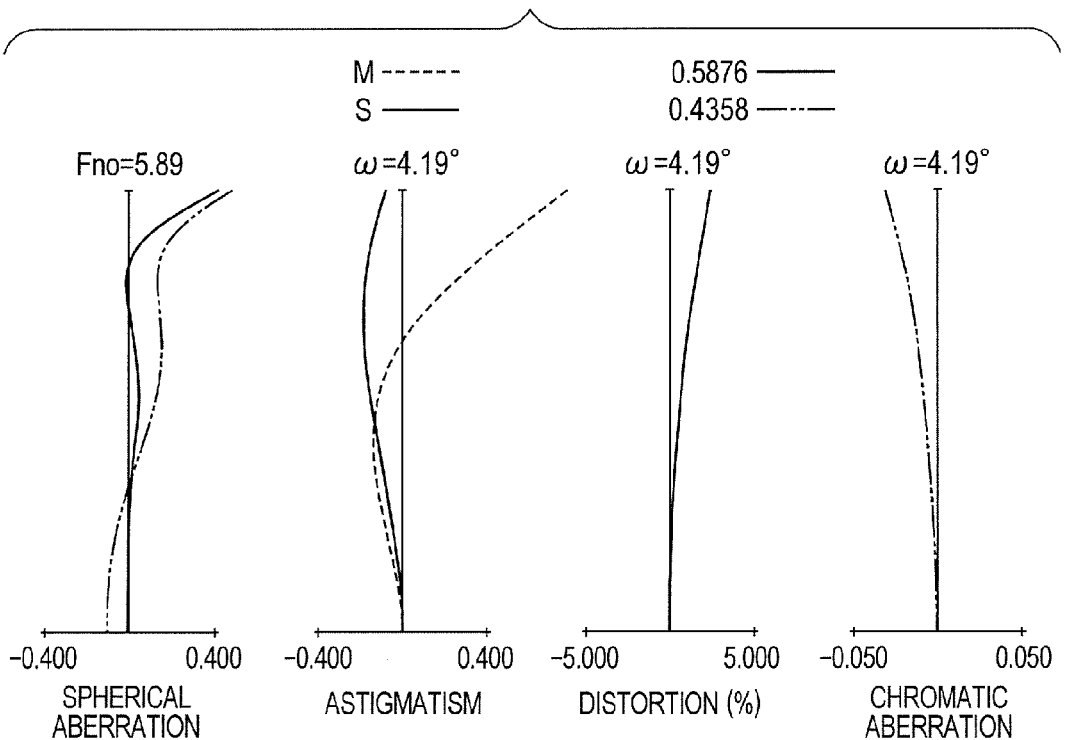
FIG. 8B is an aberration diagram of the zoom lens of Embodiment 4 at the telephoto end.
Figure 9:
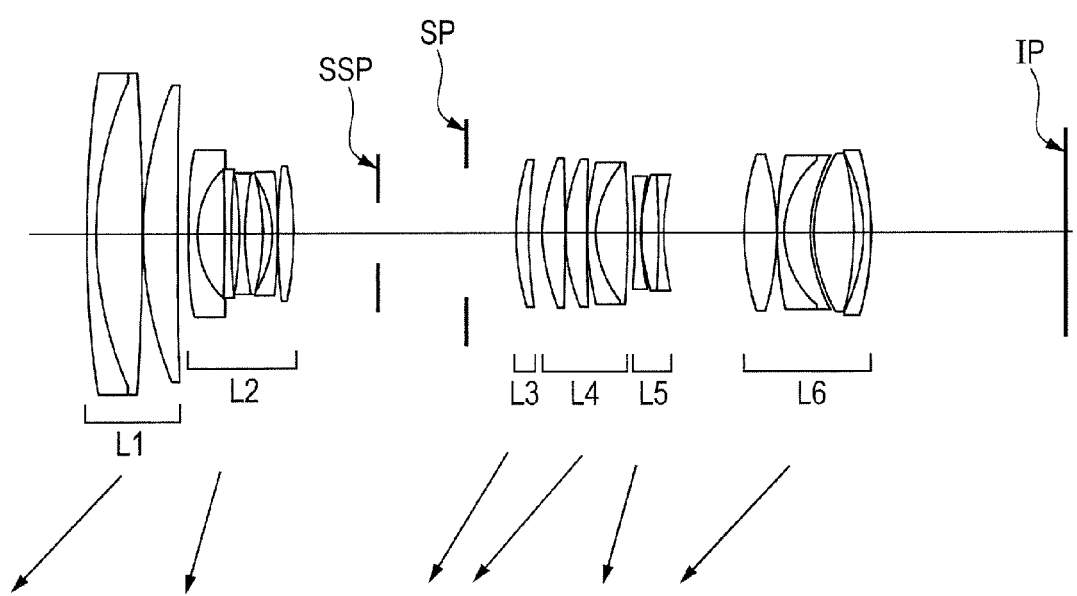
FIG. 9 is a lens sectional view of the zoom lens of Embodiment 5 at the wide angle end.
Figure 10A:
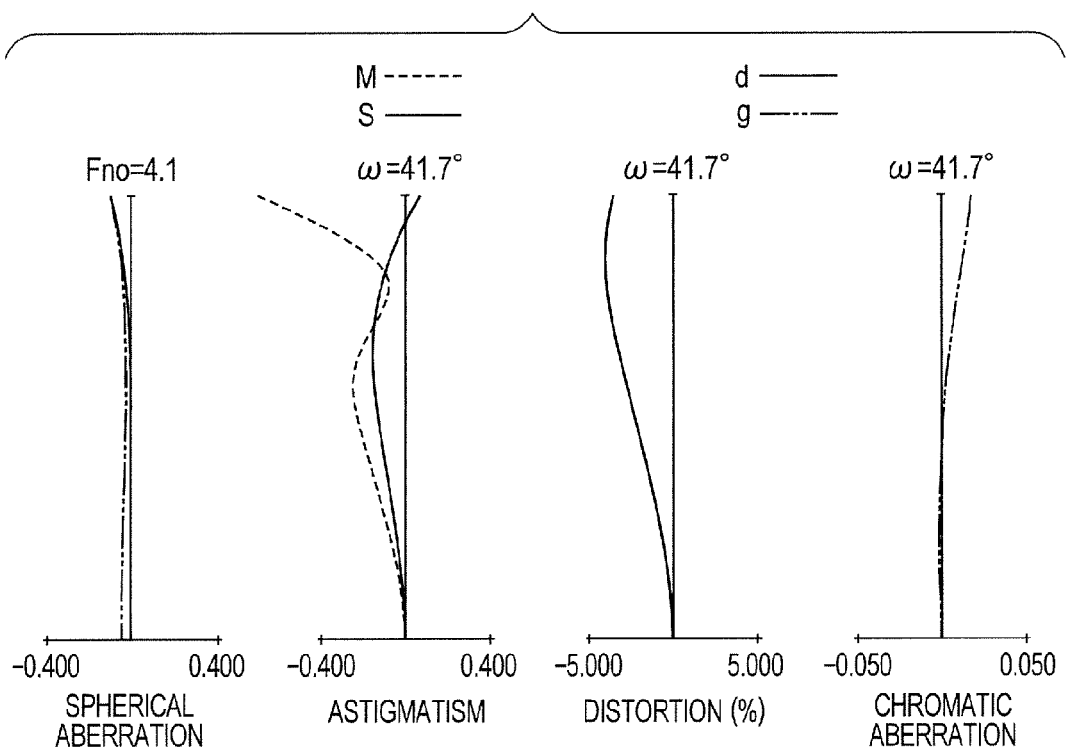
FIG. 10A is an aberration diagram of the zoom lens of Embodiment 5 at the wide angle end.
Figure 10B:
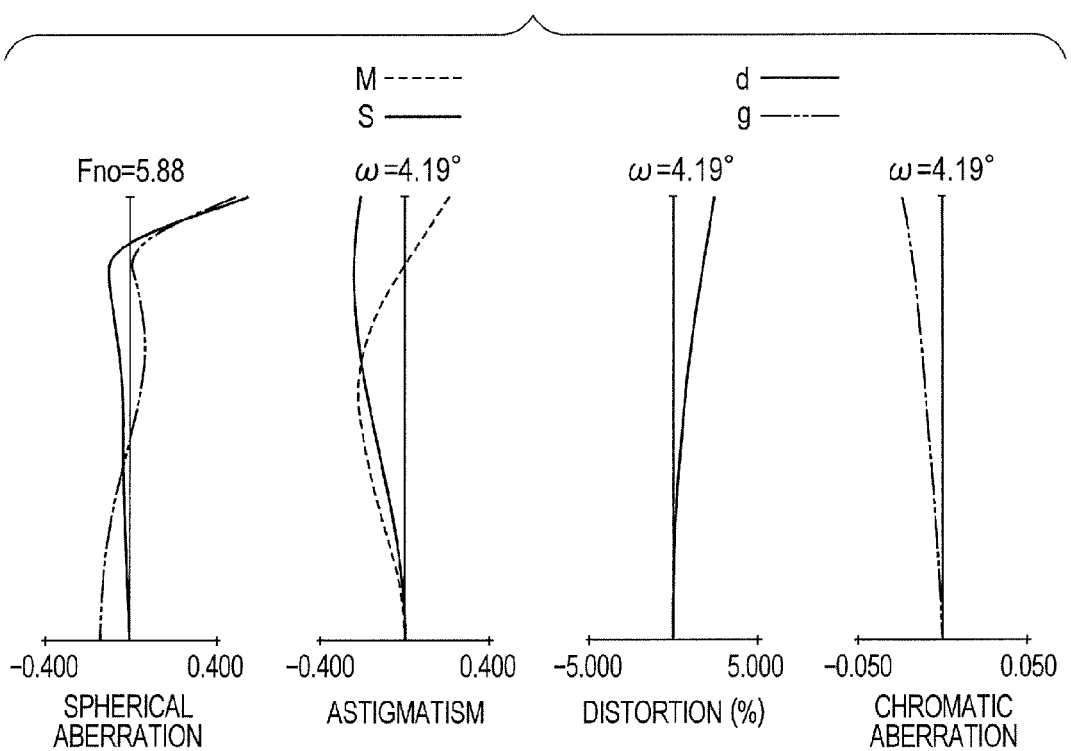
FIG. 10B is an aberration diagram of the zoom lens of Embodiment 5 at the telephoto end.
Figure 11:
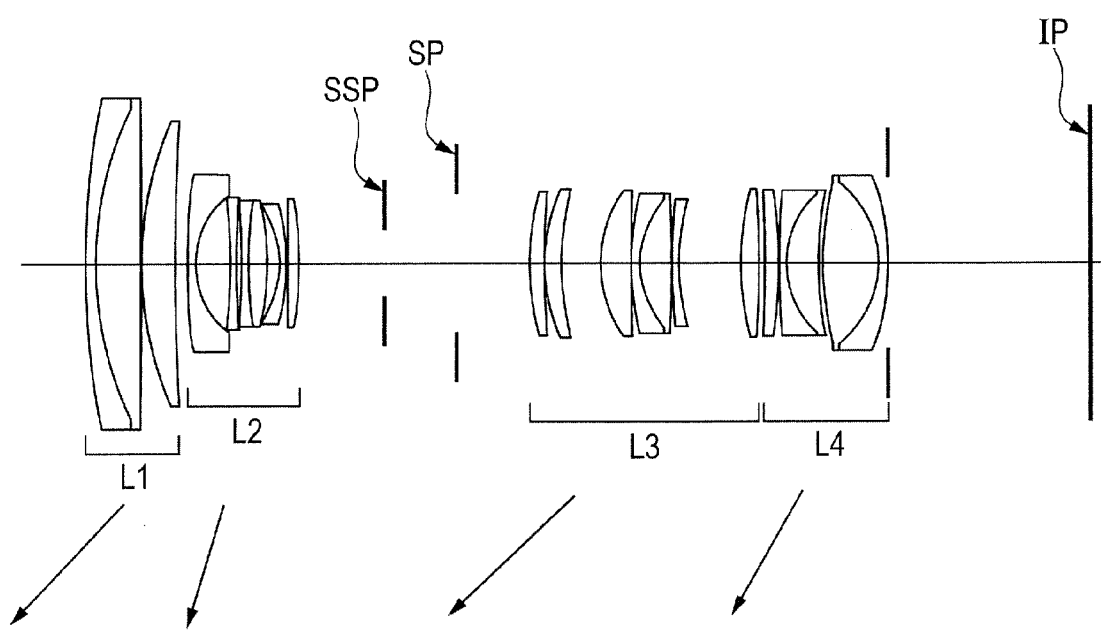
FIG. 11 is a lens sectional view of a zoom lens of Embodiment 6 at the wide angle end.
Figure 12A:
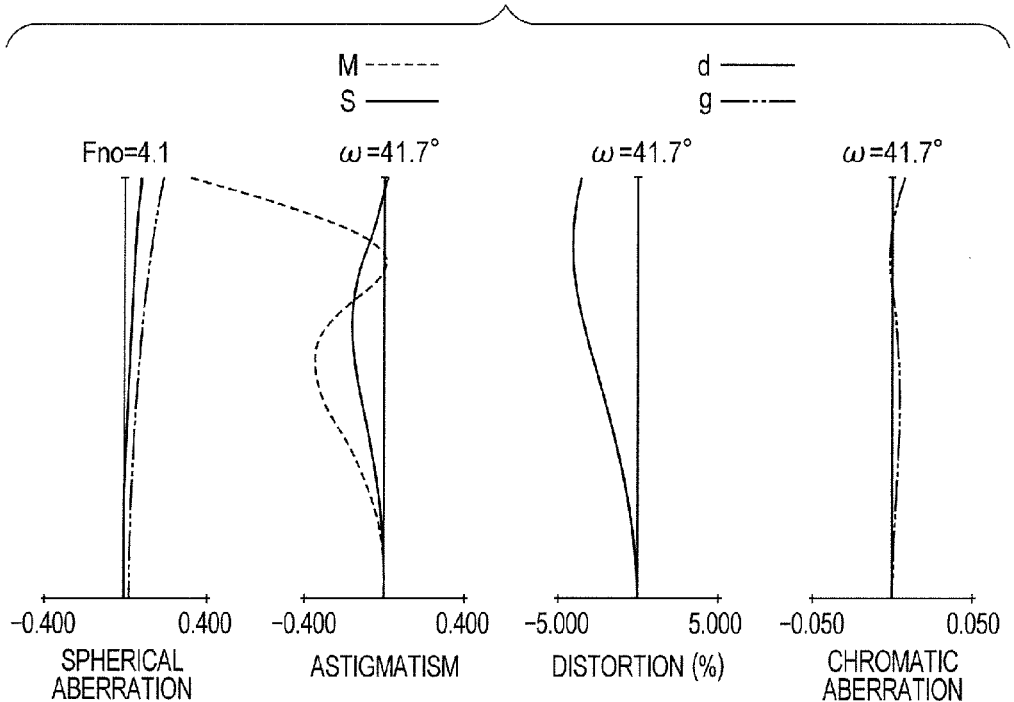
FIG. 12A is an aberration diagram of a zoom lens of Embodiment 6 at the wide angle end.
Figure 12B:
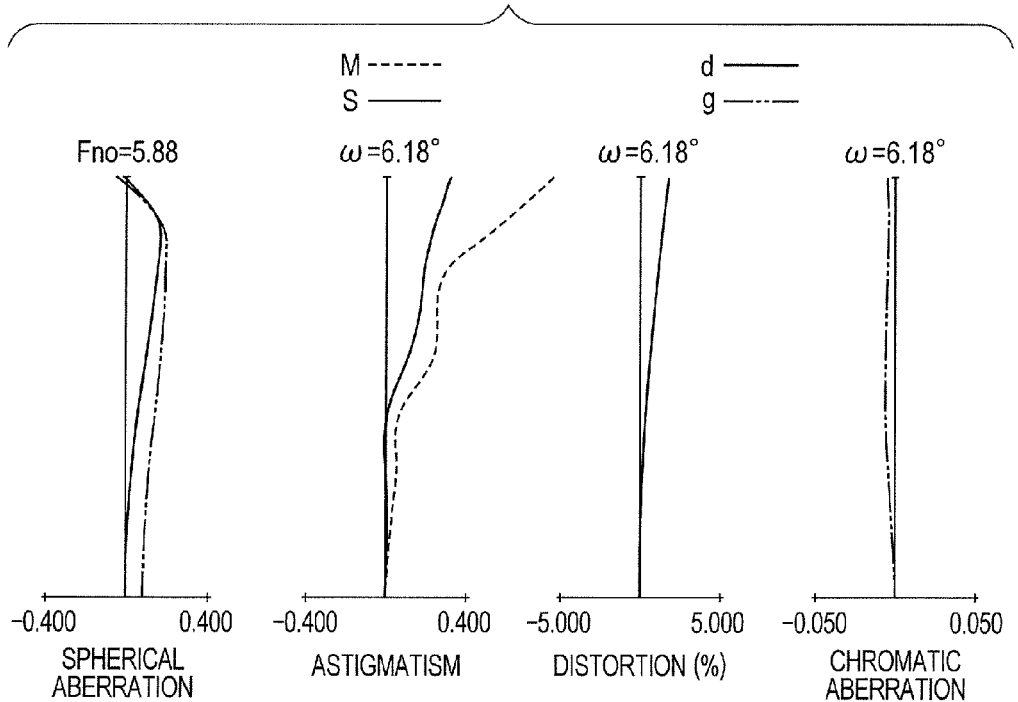
FIG. 12B is an aberration diagram of a zoom lens of Embodiment 6 at the telephoto end.
Figure 13:
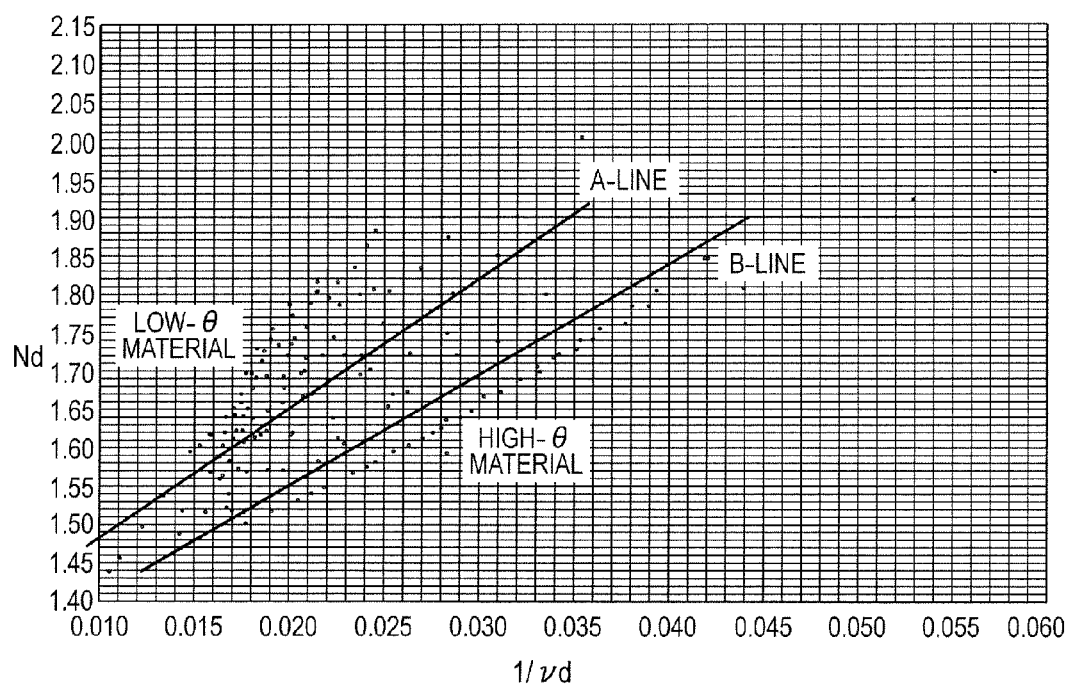
FIG. 13 is a diagram illustrating a relationship between the refractive index and dispersion of an optical material.
Figure 14:
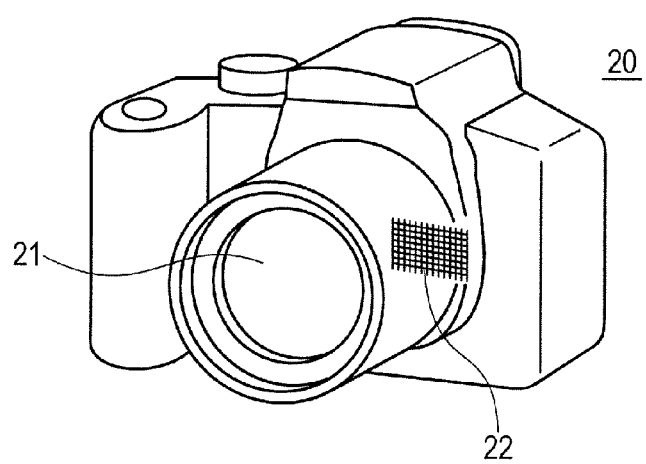
FIG. 14 is a schematic view of a main part of an image pickup apparatus of the present invention.

FIG. 5 is a lens sectional view of a zoom lens of Embodiment 3 at the wide angle end during focusing on an object at infinity. FIGS. 6A and 6B are longitudinal aberration diagrams of the zoom lens of Embodiment 3 at the wide angle end and the telephoto end, respectively, during focusing on an object at infinity. FIG. 7 is a lens sectional view of a zoom lens of Embodiment 4 at the wide angle end during focusing on an object at infinity. FIGS. 8A and 8B are longitudinal aberration diagrams of the zoom lens of Embodiment 4 at the wide angle end and the telephoto end, respectively, during focusing on an object at infinity. FIG. 9 is a lens sectional view of a zoom lens of Embodiment 5 at the wide angle end during focusing on an object at infinity. FIGS. 10A and 10B are longitudinal aberration diagrams of the zoom lens of Embodiment 5 at the wide angle end and the telephoto end, respectively, during focusing on an object at infinity. FIG. 11 is a lens sectional view of a zoom lens of Embodiment 6 at the wide angle end during focusing on an object at infinity. FIGS. 12A and 12B are longitudinal aberration diagrams of the zoom lens of Embodiment 6 at the wide angle end and the telephoto end, respectively, during focusing on an object at infinity. FIG. 13 is a diagram illustrating of a relationship between the refractive index and the Abbe number of an optical material. FIG. 14 is a schematic view of a main part of a digital still camera (image pickup apparatus) that includes a zoom lens of the present invention.

A zoom lens of each embodiment is an imaging lens system adopted in an image pickup apparatus, such as a video camera, a digital still camera, a silver halide film camera or a TV camera. The zoom lens of each embodiment can be adopted as a projection optical system for a projection apparatus (projector). In the lens sectional view, the left is an object side (front side) and the right is an image side (rear side). In the lens sectional view, with respect to an order i of a lens unit from the object side, a lens unit Li is an i-th lens unit, and a rear unit LR includes at least one lens unit.

A first lens unit L1 has a positive refractive power. A second lens unit L2 has a negative refractive power. In zoom lenses of Embodiments 1 to 4 the rear unit LR consists of a third lens unit L3 having a positive refractive power, a fourth lens unit L4 having a negative refractive power, and a fifth lens unit L5 having a positive refractive power. In the zoom lens of Embodiment 5, the rear unit LR consists of a third lens unit L3 having positive refractive power, a fourth lens unit L4 having a positive refractive power, a fifth lens unit L5 having a negative refractive power and a sixth lens unit L6 having a positive refractive power. In the zoom lens of Embodiment 6, the rear unit LR consists of a third lens unit L3 having a positive refractive power, and a fourth lens unit L4 having a positive refractive power.

An aperture stop SP and an auxiliary aperture stop SSP block unnecessary light. On an image plane IP, an image pickup plane of a solid-state image pickup element, such as a CCD sensor or a CMOS sensor, is disposed in the case of an imaging optical system of a video camera or a digital still camera, and a photosensitive surface corresponding to a film surface is disposed in the case of a camera for silver halide film. With reference to spherical aberration, distortion, and chromatic aberration, solid lines indicate d-lines (wavelength of 587.6 nm), and chain double-dashed lines indicate g-lines (wavelength of 435.8 nm). With reference to astigmatism, chain lines indicate the meridional image planes of d-lines, and solid lines indicate the sagittal image planes of d-lines. The F-number Fno, and half angle of view $\omega$ (degree) are also illustrated.

In each of the following embodiments, the wide angle end and the telephoto end are zoom positions in the case where each lens unit resides at the opposite ends of a mechanically movable range on the optical axis. Arrows indicate the movement loci of the respective lens units from the wide angle end to the telephoto end during zooming.

In each embodiment, focusing from infinity to a short distance is performed by moving the second lens unit L2 to the object side.

In Embodiment 1 of FIG. 1, during zooming from the wide angle end to the telephoto end, the first lens unit L1 moves to the object side as indicated by the arrow. The second lens unit L2 moves to the object side along a convex locus. The third lens unit L3 moves to the object side while reducing the interval with the second lens unit L2. The fourth lens unit L4 moves to the object side while increasing the interval with the third lens unit L3. The fifth lens unit L5 moves to the object side while reducing the interval with the fourth lens unit L4.

In Embodiment 2 of FIG. 3, the first lens unit L1 moves to the object side during zooming from the wide angle end to the telephoto end as indicated by the arrow. The second lens unit L2 moves to the image side along a convex locus. The third lens unit L3 moves to the object side while reducing the interval with the second lens unit L2. The fourth lens unit L4 moves to the object side while increasing the interval with the third lens unit L3. The fifth lens unit L5 moves to the object side while reducing the interval with the fourth lens unit L4.

In Embodiment 3 of FIG. 5 and Embodiment 4 of FIG. 7, the first lens unit L1 moves to the object side during zooming from the wide angle end to the telephoto end as indicated by the arrow. The second lens unit L2 moves to the object side while increasing the interval with the first lens unit L1. The third lens unit L3 moves to the object side while reducing the interval with the second lens unit L2. The fourth lens unit L4 moves to the object side while increasing the interval with the third lens unit L3. The fifth lens unit L5 moves to the object side while reducing the interval with the fourth lens unit L4.

In the zoom lens of Embodiment 5, each lens unit moves to the object side during zooming from the wide angle end to the telephoto end. During zooming, the interval between the first lens unit L1 and the second lens unit L2 increases, the interval between the second lens unit L2 and the third lens unit L3 decreases, and the interval between the third lens unit L3 and the fourth lens unit L4 decreases. During zooming, the interval between the fourth lens unit L4 and the fifth lens unit L5 increases, and the interval between the fifth lens unit L5 and the sixth lens unit L6 decreases.

In the zoom lens of Embodiment 6, each lens unit moves to the object side during zooming from the wide angle end to the telephoto end. During zooming, the interval between the first lens unit L1 and the second lens unit L2 increases, the interval between the second lens unit L2 and the third lens unit L3 decreases, and the interval between the third lens unit L3 and the fourth lens unit L4 decreases.

Typically, the configuration includes, in order from the object side to the image side: a first lens unit having a positive refractive power; a second lens unit having a negative refractive power; and a rear unit including at least one lens unit. A zoom lens where the interval between adjacent lens units vary during zooming can relatively easily achieve high magnification.

To appropriately correct the axial chromatic aberration and the lateral chromatic aberration, the zoom lens having a high zoom ratio requires reduction of variation in aberration over the entire zoom range during zooming from the wide angle end to the telephoto end. One of most simplest methods of reducing variation in aberration in this case is to adopt a first lens unit and a second lens unit that have low powers to reduce the lateral chromatic aberration itself between the units. Unfortunately, this method significantly increases the size of the entire system.

To address this problem, the zoom lens of the present invention pays attention to variation in the incident height of an on-axial beam and the incident height of off-axial principal ray during zooming. In general, in a zoom lens having a high zoom ratio, the incident height of an off-axial principal ray onto a second lens unit for variable magnification is significantly great at the wide angle end, while the ray passes through a position near the optical axis at the telephoto end and the height is small.

A unit where the incident height of an off-axial principal ray is overwhelmingly great at the telephoto end is the first lens unit. To reduce variation in lateral chromatic aberration during zooming, it is appropriate to thoroughly reduce the lateral chromatic aberration of the second lens unit at the wide angle end while reducing the lateral chromatic aberration of the first lens unit at the telephoto end. Since the incident height of the on-axial beam is low at both the first and second lens units at the wide angle end, the axial chromatic aberration is corrected by a lens unit arranged nearer to the image side than the second lens unit.

At the telephoto end, the incident height of the on-axial beam onto the first lens unit is overwhelmingly great in the entire system. Accordingly, to reduce variation in axial chromatic aberration during zooming, the second lens unit is not much important and it is appropriate to correct the axial chromatic aberration of the first lens unit at the telephoto end. Thus, the first lens unit is important to correct both the lateral chromatic aberration and the axial chromatic aberration at the telephoto end. Accordingly, it is appropriate that the first lens unit include a positive lens made of a material that has a low dispersion and a high partial dispersion ratio, and a negative lens made of a material that has a low partial dispersion ratio.

According to the above description, to reduce variation in chromatic aberration of the zoom lens having a high zoom ratio during zooming, it is appropriate to correct the lateral chromatic aberration at the wide angle end through the second lens unit. Typically, to correct the chromatic aberration of the lens unit having a negative refractive power, it is appropriate to adopt a negative lens made of a low dispersion material, and a positive lens made of a high dispersion material.

In a zoom lens having a high zoom ratio, the power (refractive power) of a variable magnification lens unit is high. It has therefore been considered that achievement of a large difference in dispersion between the material of a positive lens and the material of a negative lens should be important. However, in consideration of the secondary spectrum, typically, a low dispersion material has a low partial dispersion ratio θgF, and a high dispersion material has a high partial dispersion ratio θgF. Accordingly, the chromatic aberration on the short wavelength side is overcorrected, which reduces the lateral chromatic aberration.

To address this problem, the zoom lens of the present invention adopts a material having a low partial dispersion ratio as the material of a positive lens. Accordingly, the primary and secondary chromatic aberrations are appropriately corrected.

More specifically, a material within a range between an A-line and a B-line illustrated in FIG. 13 is adopted. In FIG. 13, a low-θ material means a material having a low partial dispersion ratio. A high-θ material means a material having a high partial dispersion ratio. In this case, as to the primary dispersion, correction effects of lateral chromatic aberration is weakened. Accordingly, to reduce the chromatic aberration caused by each lens, at least three negative lenses are adopted in a second lens unit, which disperses the negative refractive power, thereby reducing occurrence of the primary lateral chromatic aberration.

The positive lens also has a low dispersion. Accordingly, if the chromatic aberration were corrected through one lens, the positive refractive power would have become too strong to cause a large spherical aberration. Accordingly, the positive refractive power is shared by multiple lenses. Furthermore, all the multiple positive lenses adopt high dispersion materials having low partial dispersion ratios θgF. This adoption appropriately corrects the lateral chromatic aberration at the wide angle end. The axial chromatic aberration increases on the short wavelength side. There are, however, points where more effective correction can be performed in the rear unit LR at the wide angle end and in the first lens unit at the telephoto end. The inventor has found that this usage is the best for the second lens unit.

As described above, each embodiment achieves a zoom lens having a low lateral chromatic aberration and a high zoom ratio over the entire zoom range.

In each embodiment, the rear unit LR has a positive refractive power over the entire zoom range. The second lens unit L2 includes at least three negative lenses and at least two positive lenses. The refractive index and Abbe number of the material are defined as Nd and vd, respectively. All the positive lenses of the second lens unit L2 satisfy the following conditional expression, $$1.264+14.3/vd < Nd < 1.317+16.667/vd. \quad (1)$$

If the number of negative lenses included in the second lens unit L2 is two or less, the amount of occurrence of the primary lateral chromatic aberration increases. Accordingly, it is difficult for the positive lens made of a relatively low dispersion material as indicated by the conditional expression (1) to correct the aberration, and is inappropriate. If the number of positive lenses is one, the positive lens made of a relatively low dispersion material as indicated by conditional expression (1) is required to have a high power. As a result, the spherical aberration increases. If the upper limit value of the conditional expression (1) is exceeded, it is difficult to correct the primary lateral chromatic aberration. If the lower limit value of the conditional expression (1) is fallen short of, the partial dispersion ratio θgF increases to overcorrect the secondary lateral chromatic aberration, which is inappropriate.

It is more appropriate that the conditional expression (1) be in the following numerical value range, $$1.270+14.3/\nu d < Nd < 1.287+16.667/\nu d. \quad (1a)$$

In each embodiment, the Abbe number νd, the partial dispersion ratio θgF with respect to g-line and F-line are as follows. The refractive indices of the material for the g-line (wavelength of 435.8 nm), F-line (486.1 nm), C-line (656.3 nm) and d-line (587.6 nm) are defined as Ng, NF, NC and Nd, respectively. In this case, the Abbe number νd and the partial dispersion ratio θgF have values represented as follows.

$$\nu d = (Nd-1)/(NF-NC)$$

$$\theta gF = (Ng-NF)/(NF-NC)$$

As described above, according to each embodiment, the zoom lens having a high zoom ratio where the axial chromatic aberration and the lateral chromatic aberration are appropriately corrected over the entire zoom range can be achieved.

Next, characteristics other than the characteristics descried in each embodiment are described. Each embodiment consists of, in order from the object side to the image side: a first lens unit L1 having a positive refractive power; a second lens unit L2 having a negative refractive power; an aperture stop SP; and a rear unit LR that includes at least one lens unit and has a positive refractive power over the entire zoom range.

The Abbe number νd2pi is of the material of an i-th positive lens G2pi counted from the object side of the second lens unit L2. The partial dispersion ratio θgF2pi is of the material of the positive lens G2pi with respect to the g-line and F-line. The focal length f2pi is of the positive lens G2pi. The following relationship is then assumed.

$$X2pi = \theta gF2pi - 0.6438 + 0.001682 \times \nu d2pi \quad (a1)$$

The Abbe number νd2ni is of the material of an i-th negative lens G2ni of the second lens unit L2 counted from the object side. The partial dispersion ratio θgF2ni is of the material of negative lens G2ni with respect to the g-line and F-line. The following relationship is then assumed.

$$X2ni = \theta gF2ni - 0.6438 + 0.001682 \times \nu d2ni \quad (a2)$$

The first lens unit L1 includes multiple lenses. The Abbe number νd1j is of the material of a j-th lens G1j of the first lens unit L1 counted from the object side. The partial dispersion ratio θgF1j is of the lens G1j with respect to the g-line and F-line. The lens G1j has a focal length f1j. The following relationship is then assumed.

$$X1j = \theta gF1j - 0.6438 + 0.001682 \times \nu d1j \quad (a3)$$

The first lens unit L1 has a focal length f1. The focal length fw is of the entire system at the wide angle end. The second lens unit L2 has a focal length f2. In this case, it is appropriate to satisfy at least one of the following conditional expressions.

$$-0.010 < (\Sigma X2pi/f2pi)/(\Sigma 1/f2pi) < 0.008 \quad (2)$$

$$0.01 < X2ni < 0.10 \quad (3)$$

$$60 < \nu d2ni \quad (4)$$

$$0.03 < (\Sigma X1j/f1j)/(\Sigma 1/f1j) < 0.10 \quad (5)$$

$$4.0 < f1/fw < 8.0 \quad (6)$$

$$0.60 < -f2/fw < 1.10 \quad (7)$$

Next, the technical meaning of each of the foregoing conditional expressions is described.

If the upper limit value of the conditional expression (2) is exceeded, it is difficult to correct the secondary lateral chromatic aberration. If the lower limit of the conditional expression (2) is fallen short of, the primary dispersion is too low through a typical optical material. Accordingly, these cases are inappropriate. It is more appropriate that the conditional expression (2) be within the following numerical value range.

$$-0.008 < (\Sigma X2pi/f2pi)/(\Sigma 1/f2pi) < 0.006 \quad (2a)$$

The conditional expressions (3) and (4) are for the material of at least one negative lens G2ni among the negative lenses configuring the second lens unit L2.

The conditional expressions (3) and (4) is for reducing the amount of occurrence of the primary lateral chromatic aberration while increasing the amount of occurrence of the secondary lateral chromatic aberration in the negative lens G2ni. These expressions reduce the burden of correcting the primary and secondary lateral chromatic aberrations of the positive lenses included in the second lens unit L2. The conditional expressions (3) and (4) may more appropriately be in the following numerical value range.

$$0.012 < X2ni < 0.080 \quad (3a)$$

$$64 < \nu d2ni \quad (4a)$$

The conditional expression (5) is for appropriately correct the lateral chromatic aberration and the axial chromatic aberration at the telephoto end. If the upper limit of the conditional expression (5) is exceeded, the axial chromatic aberration is overcorrected at the telephoto end. If the lower limit value of the conditional expression (5) is fallen short of, the lateral chromatic aberration is undercorrected at the telephoto end. The conditional expression (5) may more appropriately be in the following numerical value range.

$$0.04 < (\Sigma X1j/f1j)/(\Sigma 1/f1j) < 0.08 \quad (5a)$$

The conditional expressions (6) and (7) are for reducing the size of the entire system while achieving high optical characteristics. If the upper limits of the conditional expressions (6) and (7) are exceed, the size of the entire system increases. If lower limits of the conditional expressions (6) and (7) are fallen short of, variation in spherical aberration during zooming increases, and it is difficult to achieve high optical characteristics. The conditional expressions (6) and (7) may more appropriately be in the following numerical value ranges.

$$4.5 < f1/fw < 7.5 \quad (6a)$$

$$0.70 < -f2/fw < 1.00 \quad (7a)$$

In each embodiment, if the second lens unit L2 is configured to include at least four negative lenses, the amount of occurrence of the primary lateral chromatic aberration decreases, which is appropriate.

Next, the specific lens configurations of the respective embodiments are described. Embodiment 1 includes, in order from the object side to the image side: a first lens unit L1 having a positive refractive power; a second lens unit L2 having a negative refractive power; a third lens unit L3 having a positive refractive power; a fourth lens unit L4 having a negative refractive power; and a fifth lens unit L5 having a positive refractive power. Embodiment 1 is a five-unit zoom lens having a zoom ratio of 12.14.

During zooming from the wide angle end to the telephoto end, the second lens unit L2 moves along a locus convex to the object side. All the lens units move to the object side at the telephoto end in comparison with the case at the wide angle end. The interval between the first lens unit L1 and the second lens unit L2 is longer and the interval between the second lens unit L2 and the third lens unit L3 is shorter at the telephoto end than the case at the wide angle end. Likewise, the interval between the third lens unit L3 and the fourth lens unit L4 is longer, and the interval between the fourth lens unit L4 and the fifth lens unit L5 is shorter at the telephoto end than the case at the wide angle end.

The second lens unit L2 consists of four negative lenses and two positive lenses. More specifically, this unit consists of, in order from the object side to the image side: a negative lens, a negative lens, a negative lens, a positive lens, a negative lens and a positive lens. Both the two positive lenses satisfy the conditional expression (1), and also satisfy the conditional expression (2), and appropriately correct the primary and secondary lateral chromatic aberrations at the wide angle end. The negative lens of the second lens unit L2 nearest to the image side satisfies the conditional expressions (3) and (4), which further appropriately correct the lateral chromatic aberration at the wide angle end.

The first lens unit L1 satisfies the conditional expression (5), which appropriately corrects the axial chromatic aberration and the lateral chromatic aberration at the telephoto end. The powers (refractive powers) of the first lens unit L1 and the second lens unit L2 satisfy the conditional expressions (6) and (7), which reduce the size of the entire system while achieving high optical characteristics.

Embodiment 2 has the same number of lens units and the same refractive power of each lens unit as those of Embodiment 1. Embodiment 2 is a five-unit zoom lens having a zoom ratio of 12.14. During zooming from the wide angle end to the telephoto end, the first lens unit L1, the third lens unit L3, the fourth lens unit L4 and the fifth lens unit L5 move to the object side. The second lens unit L2 moves along a locus convex to the image side. The variation in intervals between the lens units at the telephoto end from the case at the wide angle end is the same as that of Embodiment 1.

The second lens unit L2 consists of three negative lenses and three positive lenses. More specifically, this unit consists of, in order from the object side to the image side: a negative lens, a negative lens, a positive lens, a positive lens, a negative lens and a positive lens. All the three positive lenses satisfy the conditional expression (1) while also satisfying the conditional expression (2), and appropriately correct the primary and secondary lateral chromatic aberrations at the wide angle end. The negative lens of the second lens unit L2 nearest to the image side satisfy the conditional expressions (3) and (4), which appropriately correct the lateral chromatic aberration at the wide angle end.

The first lens unit L1 satisfies the conditional expression (5), which appropriately corrects the axial chromatic aberration and the lateral chromatic aberration at the telephoto end. The powers of the first lens unit L1 and the second lens unit L2 satisfy conditional expressions (6) and (7), which reduce the size of the entire system while achieving high optical characteristics.

Embodiment 3 has the same number of lens units and the same refractive power of each lens unit as those of Embodiment 1. Embodiment 3 is a five-unit zoom lens having a zoom ratio of 12.14. During zooming from the wide angle end to the telephoto end, all the lens units move to the object side. The variation in intervals between the lens units at the telephoto end from the case at the wide angle end is the same as that in Embodiment 1. The lens configuration of the second lens unit L2 is the same as the configuration of Embodiment 1. The advantageous effects acquired through the lens configuration are the same as the effects of Embodiment 1.

The first lens unit L1 satisfies the conditional expression (5), which exerts advantageous effects analogous to those of Embodiment 1. The powers of the first lens unit L1 and the second lens unit L2 satisfy the conditional expressions (6) and (7), which exert advantageous effects analogous to those of Embodiment 1.

Embodiment 4 has the same number of lens units and the same refractive power of each lens unit as those of Embodiment 1. Embodiment 4 is a five-unit zoom lens having a zoom ratio of about 12. During zooming from the wide angle end to the telephoto end, all the lens units move to the object side. The variation in intervals between lens units at the telephoto end from the wide angle end is the same as the case in Embodiment 1. The lens configuration of the second lens unit L2 is the same as that of Embodiment 2. The advantageous effects acquired through the lens configuration are the same as the effects of Embodiment 2.

The first lens unit L1 satisfies the conditional expression (5), which exerts advantageous effects analogous to those of Embodiment 2. The powers of the first lens unit L1 and the second lens unit L2 satisfy the conditional expressions (6) and (7), which exert advantageous effects analogous to those of Embodiment 2.

The zoom lens of Embodiment 5 includes, in order from the object side to the image side; a first lens unit L1 having a positive refractive power; a second lens unit L2 having a negative refractive power; a third lens unit L3 having a positive refractive power; a fourth lens unit L4 having a positive refractive power; a fifth lens unit L5 having a negative refractive power; and a sixth lens unit L6 having a positive refractive power. Embodiment 5 is a six-unit zoom lens having a zoom ratio of 12.14. During zooming from the wide angle end to the telephoto end, all the lens units move to the object side.

The second lens unit L2 consists of four negative lenses, and two positive lenses. More specifically, this unit consists of, in order from the object side to the image side: a negative lens, a negative lens, a negative lens, a positive lens, a negative lens and a positive lens. Both of the two positive lenses satisfy the conditional expression (1) and also satisfy the conditional expression (2), and appropriately correct the primary and secondary lateral chromatic aberrations at the wide angle end. The negative lens of the second lens unit L2 nearest to the image side satisfies the conditional expressions (3) and (4), which appropriately correct the lateral chromatic aberration at the wide angle end.

The first lens unit L1 satisfies the conditional expression (5), which appropriately corrects the axial chromatic aberration and the lateral chromatic aberration at the telephoto end. Furthermore, the powers (refractive powers) of the first lens unit L1 and the second lens unit L2 satisfy the conditional expressions (6) and (7), which reduce the size of the entire system while achieving high optical characteristics.

The zoom lens of Embodiment 6 includes, in order from the object side to the image side: a first lens unit L1 having a positive refractive power; a second lens unit L2 having a negative refractive power; a third lens unit L3 having a positive refractive power; and a fourth lens unit L4 having a positive refractive power. Embodiment 6 is a four-unit zoom lens having a zoom ratio of 8.23. During zooming from the wide angle end to the telephoto end, all the lens units move to the object side.

The second lens unit L2 consists of four negative lenses and two positive lenses. More specifically, this unit consists of, in order from the object side to the image side: a negative lens, a negative lens, a negative lens, a positive lens, a negative lens and a positive lens. Both the two positive lenses satisfy the conditional expression (1) and also satisfy the relationship of the conditional expression (2), which appropriately corrects the primary and secondary lateral chromatic aberrations at the wide angle end. The negative lens of the second lens unit L2 nearest to the image side satisfies the conditional expressions (3) and (4), which appropriately correct the lateral chromatic aberration at the wide angle end.

The first lens unit L1 satisfies the conditional expression (5), which appropriately corrects the axial chromatic aberration and the lateral chromatic aberration at the telephoto end. The powers (refractive power) of the first lens unit L1 and the second lens unit L2 satisfy the conditional expressions (6) and (7), which reduce the size of the entire system while achieving high optical characteristics.

FIG. 14 is a schematic view of a main part of a digital still camera including the zoom lens of each embodiment. FIG. 14 illustrates a camera main body 20, and an imaging optical system 21 composed of any of the zoom lenses described in the embodiments. A solid-state image pickup element (photo-electric conversion element) 22, such as a CCD sensor or a CMOS sensor, is embedded in the camera main body 20, and receives a subject image formed by the imaging optical system 21.

Specific numerical data of Numerical Examples 1 to 6 corresponding to respective Embodiments 1 to 6 are hereinafter described. In Each Numerical Example, the surface number i is counted from the object side. A curvature radius ri is of i-th optical surface (i-th surface). The axial interval di is between the i-th surface and (i+1)-th surface. A refractive index ndi and an Abbe number νdi are for d-line and of the material of the i-th optical element. Furthermore, an effective diameter is also described.

In addition to the specifications of the focal length and F-number, the description also includes an angle of view that is half angle of view (degree) of the entire system, an image height that is the maximum image height that defines the half angle of view, a lens total length that is the distance from the first lens surface to the image plane, and a back focus BF that represents the length from the final lens surface to the image plane. Zoom unit data represents the focal length, the length on the optical axis, the front principal point position, and the rear principal point position of each lens unit. Provided that the surface position Sag(R) is in the optical axis direction at a position distant by R from the optical axis in a direction perpendicular to the optical axis, an aspherical surface is a shape satisfying the following relationship.

$$Sag(R) = \frac{(1/R) \times R^2}{1+\sqrt{1-(1+K)\times(1/r)^2 \times R^2}} + A4 \times R^4 + A6 \times R^6 + A8 \times R^8 + A10 \times R^{10} + A12 \times R^{12} + A14 \times R^{14}$$

[Expression 1]

The aspherical coefficients of aspherical surfaces are listed on tables. Portions where the intervals d between optical surfaces are (Variable) vary during zooming. The surface intervals according to the focal lengths are listed in an appended table. Portions where the effective diameters of the optical surfaces are (Variable) vary during zooming. The effective diameters ea (i) according to the focal lengths are listed in the appended table.

Table 1 lists calculation results of the conditional expressions based on the lens data on the following Numerical Examples 1 to 6. Table 1 lists the focal lengths ft at the telephoto ends of the entire systems. For variator configurations, the orders of lenses from the object side are listed. "Negative" indicates a negative lens. "Positive" indicates a positive lens. The refractive index Nij is of the material of a j-th lens of the i-th lens unit, the lens being the j-th counted from the object side. The Abbe number νij is of the material of the j-th lens of the i-th lens unit, the lens being the j-th counted from the object side.

The partial dispersion ratio θgFij is of the material of the j-th lens of the i-th lens unit, the lens being the j-th counted from the object side. The focal length fij is of the j-th lens of the i-th lens unit, the lens being the j-th counted from the object side. The expression Xij represents the value of the Expression (a1), Expression (a2) or Expression (a3) of the j-th lens of the i-th lens unit, the lens being the j-th counted from the object side.

Numerical Example 1

Unit mm

Surface Data

| Surface Number | r | d | nd | νd | Effective Diameter |
|---|---|---|---|---|---|
| 1 | 262.675 | 2.00 | 1.88300 | 40.8 | 65.82 |
| 2 | 86.266 | 9.15 | 1.49700 | 81.5 | 60.83 |
| 3 | −448.626 | 0.15 | | | 60.66 |
| 4 | 83.266 | 6.85 | 1.59522 | 67.7 | 59.96 |
| 5 | 829.784 | (Variable) | | | 59.38 |
| 6* | ∞ | 1.60 | 1.85400 | 40.4 | 33.56 |
| 7* | 22.011 | 4.47 | | | 26.11 |
| 8* | 134.326 | 1.40 | 1.77250 | 49.6 | 25.81 |
| 9 | 48.634 | 2.27 | | | 24.38 |
| 10 | −118.847 | 1.20 | 1.76385 | 48.5 | 24.31 |
| 11 | 49.293 | 4.06 | 1.72047 | 34.7 | 23.31 |
| 12 | −57.532 | 2.17 | | | 23.33 |
| 13 | −21.928 | 1.20 | 1.59522 | 67.7 | 23.32 |
| 14 | −116.471 | 0.15 | | | 24.75 |
| 15 | 186.806 | 3.04 | 1.85478 | 24.8 | 26.17 |
| 16 | −77.228 | (Variable) | | | 26.84 |
| 17 (Auxiliary Aperture Stop) | ∞ | (Variable) | | | (Variable) |
| 18 (Aperture Stop) | ∞ | (Variable) | | | 28.80 |
| 19 | 63.157 | 2.79 | 1.68893 | 31.1 | 29.44 |
| 20 | 202.862 | 0.15 | | | 29.65 |
| 21 | 45.469 | 3.96 | 1.59522 | 67.7 | 30.38 |
| 22 | 474.814 | 0.15 | | | 30.27 |
| 23 | 40.003 | 5.16 | 1.48749 | 70.2 | 30.08 |
| 24 | −247.814 | 1.50 | 2.00100 | 29.1 | 29.53 |
| 25 | 260.527 | 0.25 | | | 29.08 |
| 26 | 37.940 | 1.50 | 2.00100 | 29.1 | 28.39 |
| 27 | 18.728 | 7.67 | 1.58313 | 59.4 | 26.20 |
| 28* | −114.480 | (Variable) | | | 25.83 |
| 29* | −110.893 | 1.10 | 1.85400 | 40.4 | 20.28 |
| 30 | 109.268 | 1.00 | | | 20.29 |
| 31 | −156.672 | 1.10 | 1.88300 | 40.8 | 20.33 |
| 32 | 25.208 | 3.36 | 1.84666 | 23.8 | 20.98 |
| 33 | 196.182 | (Variable) | | | 21.25 |
| 34 | 43.435 | 6.52 | 1.59522 | 67.7 | 30.01 |
| 35 | −69.776 | 0.15 | | | 30.13 |
| 36 | 87.533 | 1.40 | 2.00100 | 29.1 | 29.59 |
| 37 | 22.893 | 5.63 | 1.43875 | 94.9 | 28.29 |
| 38 | 36.202 | 1.06 | | | 29.25 |
| 39 | 37.270 | 7.43 | 1.64769 | 33.8 | 30.32 |
| 40 | −65.462 | 2.48 | | | 30.56 |

-continued

Unit mm

| | | | | | |
|---|---|---|---|---|---|
| 41 | −29.375 | 1.60 | 1.88300 | 40.8 | 30.56 |
| 42 | −47.471 | | | | 32.02 |

Aspherical Surface Data

6th Surface

K = 0.00000e+000 A 4 = 1.86620e−005 A 6 = −3.04876e−008
A 8 = 1.60015e−011 A10 = −6.99764e−015

7th Surface

K = 0.00000e+000 A 4 = 8.50229e−006 A 6 = 4.56149e−008
A 8 = −6.92293e−011 A10 = 1.18149e−012

8th Surface

K = 0.00000e+000 A 4 = −4.19520e−006 A 6 = 2.70106e−008
A 8 = 1.21290e−010 A10 = 2.28500e−013

28th Surface

K = 0.00000e+000 A 4 = 8.33882e−006 A 6 = −1.20374e−008
A 8 = 2.87452e−011 A10 = −5.98571e−014

29th Surface

K = 0.00000e+000 A 4 = 4.12934e−006 A 6 = −1.25462e−008
A 8 = 7.22837e−011 A10 = −1.38628e−013

Various Data
Zoom ratio 12.14

| | Wide Angle | Intermediate | Telephoto |
|---|---|---|---|
| Focal Length | 24.30 | 99.98 | 294.95 |
| F-number | 4.50 | 5.76 | 5.88 |
| Half Angle of View (degree) | 41.68 | 12.21 | 4.20 |
| Image Height | 21.64 | 21.64 | 21.64 |
| Lens Total Length | 197.38 | 245.98 | 298.53 |
| BF | 38.90 | 91.95 | 92.55 |
| d 5 | 2.33 | 32.83 | 93.55 |
| d16 | 17.22 | 9.20 | 0.50 |
| d17 | 18.00 | 1.08 | 1.00 |
| d18 | 10.00 | 0.00 | 0.00 |
| d28 | 1.25 | 12.04 | 14.34 |
| d33 | 14.09 | 3.30 | 1.00 |
| ea17 | 13.60 | 27.14 | 27.81 |

Zoom Lens Unit Data

| Unit | Start Surface | Focal Length | Lens Configuration Length | Front Principal Point Position | Rear Principal Point Position |
|---|---|---|---|---|---|
| 1 | 1 | 154.14 | 18.15 | 7.34 | −4.27 |
| 2 | 6 | −20.26 | 21.56 | 1.16 | −15.77 |
| 3 | 17 | ∞ | 0.00 | 0.00 | −0.00 |
| 4 | 18 | ∞ | 0.00 | 0.00 | −0.00 |
| 5 | 19 | 30.36 | 23.04 | 3.34 | −11.65 |
| 6 | 29 | −36.46 | 6.56 | 1.25 | −2.70 |
| 7 | 34 | 71.55 | 26.28 | 0.46 | −17.34 |

Numerical Example 2

Unit mm

Surface Data

| Surface Number | r | d | nd | vd | Effective Diameter |
|---|---|---|---|---|---|
| 1 | 282.762 | 2.00 | 1.83481 | 42.7 | 66.04 |
| 2 | 81.668 | 8.92 | 1.49700 | 81.5 | 60.46 |
| 3 | −586.894 | 0.15 | | | 58.86 |
| 4 | 82.401 | 6.59 | 1.59522 | 67.7 | 57.64 |
| 5 | 1002.091 | (Variable) | | | 57.02 |
| 6* | −118.848 | 1.60 | 1.88300 | 40.8 | 36.16 |
| 7* | 24.522 | 7.53 | | | 27.87 |
| 8* | −41.458 | 1.30 | 1.88300 | 40.8 | 27.69 |
| 9 | 69.724 | 3.09 | 1.85478 | 24.8 | 27.20 |
| 10 | −361.767 | 0.15 | | | 27.06 |
| 11 | 1189.953 | 4.16 | 1.72047 | 34.7 | 26.94 |
| 12 | −35.865 | 1.86 | | | 26.73 |
| 13 | −22.324 | 1.20 | 1.59522 | 67.7 | 26.73 |
| 14 | −55.563 | 0.15 | | | 27.64 |
| 15 | 624.717 | 2.81 | 1.80000 | 29.8 | 29.45 |
| 16 | −100.191 | (Variable) | | | 30.10 |
| 17 (Auxiliary Aperture Stop) | ∞ | (Variable) | | | (Variable) |
| 18 (Aperture Stop) | ∞ | (Variable) | | | 30.98 |
| 19 | 79.830 | 4.71 | 1.51633 | 64.1 | 32.42 |
| 20 | −92.794 | 0.15 | | | 32.73 |
| 21 | 65.500 | 6.86 | 1.51823 | 58.9 | 33.15 |
| 22 | −47.641 | 1.50 | 2.00100 | 29.1 | 32.96 |
| 23 | −96.955 | 0.15 | | | 33.25 |
| 24 | 38.719 | 1.50 | 1.90366 | 31.3 | 32.47 |
| 25 | 23.224 | 8.29 | 1.58313 | 59.4 | 30.60 |
| 26* | −131.543 | (Variable) | | | 30.09 |
| 27 | −852.531 | 1.10 | 1.88300 | 40.8 | 23.85 |
| 28 | 81.384 | 1.76 | | | 23.28 |
| 29 | −73.777 | 1.10 | 1.88300 | 40.8 | 23.28 |
| 30 | 61.571 | 4.15 | 1.84666 | 23.8 | 23.29 |
| 31 | −45.255 | 0.42 | | | 23.48 |
| 32 | −70.767 | 1.10 | 1.88300 | 40.8 | 23.39 |
| 33 | 96.236 | (Variable) | | | 23.68 |
| 34 | 94.091 | 6.36 | 1.49700 | 81.5 | 36.00 |
| 35 | −69.283 | 0.15 | | | 36.35 |
| 36 | 67.608 | 1.90 | 2.00100 | 29.1 | 36.18 |
| 37 | 30.690 | 8.66 | 1.59522 | 67.7 | 34.77 |
| 38 | −226.494 | 0.15 | | | 34.69 |
| 39 | 150.720 | 1.80 | 1.90366 | 31.3 | 34.43 |
| 40 | 23.257 | 11.35 | 1.68893 | 31.1 | 33.02 |
| 41 | −74.361 | 1.01 | | | 33.13 |
| 42 | −49.134 | 1.80 | 1.88300 | 40.8 | 33.13 |
| 43 | −197.633 | | | | 33.94 |

Aspherical Surface Data

6th Surface

K = 0.00000e+000 A 4 = 2.32893e−005 A 6 = −4.11485e−008
A 8 = 7.29666e−011 A10 = −6.50838e−014

7th Surface

K = 0.00000e+000 A 4 = 7.30571e−006 A 6 = 3.37954e−008
A 8 = −2.01056e−010 A10 = 1.15910e−012

8th Surface

K = 0.00000e+000 A 4 = −4.67021e−006 A 6 = 8.01979e−009
A 8 = 2.22302e−011 A10 = 1.40305e−013

26th Surface

K = 0.00000e+000 A 4 = 2.72281e−006 A 6 = −3.68196e−009
A 8 = 1.11205e−011 A10 = −2.32863e−014

Various Data
Zoom ratio 12.14

| | Wide Angle | Intermediate | Telephoto |
|---|---|---|---|
| Focal Length | 24.30 | 99.99 | 294.97 |
| F-number | 4.10 | 5.53 | 5.93 |
| Half Angle of View (degree) | 41.68 | 12.21 | 4.19 |
| Image Height | 21.64 | 21.64 | 21.64 |
| Lens Total Length | 238.52 | 260.98 | 316.46 |
| BF | 38.90 | 92.94 | 101.87 |
| d 5 | 2.74 | 35.01 | 94.48 |
| d16 | 25.02 | 10.10 | 0.50 |
| d17 | 10.50 | 0.50 | 0.50 |
| d18 | 25.99 | 1.72 | 0.50 |
| d26 | 0.80 | 9.04 | 10.11 |

-continued

| Unit mm | | | |
|---|---|---|---|
| d33 | 27.07 | 4.17 | 1.00 |
| ea17 | 15.54 | 29.57 | 30.98 |

Zoom Lens Unit Data

| Unit | Start Surface | Focal Length | Lens Configuration Length | Front Principal Point Position | Rear Principal Point Position |
|---|---|---|---|---|---|
| 1 | 1 | 157.46 | 17.66 | 7.41 | −3.91 |
| 2 | 6 | −22.71 | 23.85 | −0.80 | −20.62 |
| 3 | 17 | ∞ | 0.00 | 0.00 | −0.00 |
| 4 | 18 | ∞ | 0.00 | 0.00 | −0.00 |
| 5 | 19 | 31.60 | 23.17 | 5.88 | −9.57 |
| 6 | 27 | −35.62 | 9.63 | 2.34 | −3.69 |
| 7 | 34 | 91.89 | 33.18 | −6.59 | −24.90 |

Numerical Example 3

| Unit mm | | | | | |
|---|---|---|---|---|---|
| Surface Data | | | | | |
| Surface Number | r | d | nd | vd | Effective Diameter |
| 1 | 191.882 | 2.00 | 1.88300 | 40.8 | 64.63 |
| 2 | 75.995 | 8.76 | 1.49700 | 81.5 | 59.36 |
| 3 | −1228.861 | 0.15 | | | 58.91 |
| 4 | 76.799 | 6.89 | 1.59522 | 67.7 | 57.64 |
| 5 | 799.157 | (Variable) | | | 56.95 |
| 6* | ∞ | 1.60 | 1.85400 | 40.4 | 33.92 |
| 7* | 21.496 | 4.93 | | | 25.98 |
| 8* | 405.002 | 1.50 | 1.77250 | 49.6 | 25.90 |
| 9 | 57.464 | 3.40 | | | 24.74 |
| 10 | −41.743 | 1.20 | 1.77250 | 49.6 | 24.61 |
| 11 | 423.803 | 3.85 | 1.72047 | 34.7 | 24.36 |
| 12 | −33.472 | 1.69 | | | 24.24 |
| 13 | −20.528 | 1.20 | 1.59522 | 67.7 | 24.24 |
| 14 | −65.604 | 0.15 | | | 25.88 |
| 15 | 511.857 | 3.03 | 1.85478 | 24.8 | 27.69 |
| 16 | −68.491 | (Variable) | | | 28.41 |
| 17 (Auxiliary Aperture Stop) | ∞ | (Variable) | | | (Variable) |
| 18 (Aperture Stop) | ∞ | 0.00 | | | 29.88 |
| 19 | 64.899 | 5.20 | 1.58913 | 61.1 | 31.69 |
| 20 | −78.082 | 0.15 | | | 31.97 |
| 21 | 90.708 | 6.22 | 1.56384 | 60.7 | 32.06 |
| 22 | −43.315 | 1.50 | 2.00100 | 29.1 | 31.87 |
| 23 | −117.956 | 0.15 | | | 32.17 |
| 24 | 31.690 | 1.50 | 1.90366 | 31.3 | 31.62 |
| 25 | 19.753 | 9.51 | 1.58313 | 59.4 | 29.40 |
| 26* | −120.893 | (Variable) | | | 28.73 |
| 27 | −95.932 | 1.10 | 1.88300 | 40.8 | 24.59 |
| 28 | 44.658 | 5.08 | 1.84666 | 23.8 | 23.97 |
| 29 | −39.030 | 1.10 | 1.85400 | 40.4 | 23.70 |
| 30* | 41.088 | (Variable) | | | 22.99 |
| 31 | 33.917 | 6.10 | 1.59522 | 67.7 | 26.88 |
| 32 | −64.096 | 0.15 | | | 26.88 |
| 33 | 134.924 | 1.30 | 2.00100 | 29.1 | 26.31 |
| 34 | 17.819 | 11.17 | 1.60342 | 38.0 | 25.01 |
| 35 | −28.425 | 0.73 | | | 25.63 |
| 36 | −23.591 | 1.40 | 1.88300 | 40.8 | 25.62 |
| 37 | −56.257 | | | | 27.38 |

Aspherical Surface Data

6th Surface

K = 0.00000e+000 A 4 = 2.15641e−005 A 6 = −1.59405e−008
A 8 = −1.70228e−010 A10 = 3.04762e−013

7th Surface

K = 0.00000e+000 A 4 = 1.89375e−005 A 6 = 1.10852e−007
A 8 = −7.63747e−011 A10 = 1.49508e−012

8th Surface

K = 0.00000e+000 A 4 = 2.71002e−006 A 6 = 5.16814e−008
A 8 = 2.76700e−010 A10 = 7.67569e−013

26th Surface

K = 0.00000e+000 A 4 = 5.01527e−006 A 6 = −1.02262e−008
A 8 = 1.27987e−011 A10 = −1.36611e−014

30th Surface

K = 0.00000e+000 A 4 = −6.88605e−006 A 6 = 6.23774e−010
A 8 = 3.09305e−011 A10 = −1.47376e−013

Various Data
Zoom ratio 12.14

| | Wide Angle | Intermediate | Telephoto |
|---|---|---|---|
| Focal Length | 24.30 | 100.00 | 294.99 |
| F-number | 4.10 | 5.66 | 5.99 |
| Half Angle of View (degree) | 41.68 | 12.21 | 4.19 |
| Image Height | 21.64 | 21.64 | 21.64 |
| Lens Total Length | 196.23 | 246.15 | 298.43 |
| BF | 38.91 | 98.09 | 109.87 |
| d 5 | 2.23 | 35.29 | 86.36 |
| d16 | 22.86 | 1.23 | 1.00 |
| d17 | 20.48 | 9.43 | 1.00 |
| d26 | 1.41 | 6.22 | 6.44 |
| d30 | 17.58 | 3.14 | 1.00 |
| ea17 | 15.77 | 23.49 | 29.88 |

Zoom Lens Unit Data

| Unit | Start Surface | Focal Length | Lens Configuration Length | Front Principal Point Position | Rear Principal Point Position |
|---|---|---|---|---|---|
| 1 | 1 | 143.57 | 17.80 | 6.33 | −5.09 |
| 2 | 6 | −19.46 | 22.59 | 0.78 | −18.07 |
| 3 | 17 | ∞ | 0.00 | 0.00 | −0.00 |
| 4 | 19 | 28.41 | 24.23 | 5.64 | −10.33 |
| 5 | 27 | −31.43 | 7.28 | 2.60 | −1.23 |
| 6 | 31 | 77.39 | 20.85 | −3.18 | −15.83 |

Numerical Example 4

| Unit mm | | | | | |
|---|---|---|---|---|---|
| Surface Data | | | | | |
| Surface Number | r | d | nd | vd | Effective Diameter |
| 1 | 227.782 | 2.00 | 1.88300 | 40.8 | 65.30 |
| 2 | 80.810 | 8.74 | 1.49700 | 81.5 | 60.06 |
| 3 | −754.473 | 0.15 | | | 58.94 |
| 4 | 82.226 | 6.67 | 1.59522 | 67.7 | 57.69 |
| 5 | 1213.652 | (Variable) | | | 57.01 |
| 6* | −1923.842 | 1.60 | 1.85400 | 40.4 | 34.85 |
| 7* | 20.809 | 7.07 | | | 26.66 |
| 8* | −51.953 | 1.30 | 1.85400 | 40.4 | 26.46 |
| 9 | 33.332 | 3.70 | 1.85478 | 24.8 | 25.18 |
| 10 | 460.674 | 0.15 | | | 24.85 |
| 11 | 1832.726 | 3.45 | 1.72047 | 34.7 | 24.84 |
| 12 | −38.450 | 1.54 | | | 24.52 |
| 13 | −22.981 | 1.20 | 1.59522 | 67.7 | 24.52 |
| 14 | −125.245 | 0.15 | | | 26.68 |
| 15 | 150.623 | 2.80 | 1.80000 | 29.8 | 28.35 |

-continued

Unit mm

| | | | | | |
|---|---|---|---|---|---|
| 16 | −143.898 | (Variable) | | | 28.98 |
| 17 (Auxiliary Aperture Stop) | ∞ | (Variable) | | | (Variable) |
| 18 (Aperture Stop) | ∞ | 0.00 | | | 30.20 |
| 19 | 74.960 | 3.38 | 1.63854 | 55.4 | 31.56 |
| 20 | −1029.641 | 0.15 | | | 31.88 |
| 21 | 56.773 | 3.46 | 1.59522 | 67.7 | 32.73 |
| 22 | 256.437 | 0.15 | | | 32.68 |
| 23 | 40.411 | 5.98 | 1.51742 | 52.4 | 32.76 |
| 24 | −160.442 | 1.50 | 2.00100 | 29.1 | 32.28 |
| 25 | 635.862 | 0.15 | | | 31.87 |
| 26 | 36.464 | 1.50 | 2.00100 | 29.1 | 30.94 |
| 27 | 19.249 | 8.55 | 1.58313 | 59.4 | 28.38 |
| 28* | −110.217 | (Variable) | | | 27.99 |
| 29 | −1128.192 | 1.10 | 1.88300 | 40.8 | 20.93 |
| 30 | 98.181 | 0.95 | | | 20.61 |
| 31 | −127.544 | 1.10 | 1.88300 | 40.8 | 20.61 |
| 32 | 22.320 | 3.36 | 1.84666 | 23.8 | 20.69 |
| 33* | 91.124 | (Variable) | | | 20.83 |
| 34 | 47.777 | 5.76 | 1.49700 | 81.5 | 26.33 |
| 35 | −52.463 | 0.15 | | | 26.56 |
| 36 | 96.080 | 1.30 | 2.00100 | 29.1 | 26.43 |
| 37 | 21.618 | 4.41 | 1.49700 | 81.5 | 25.68 |
| 38 | 37.474 | 1.47 | | | 26.44 |
| 39 | 38.163 | 6.93 | 1.69895 | 30.1 | 28.14 |
| 40 | −62.571 | 1.84 | | | 28.51 |
| 41 | −30.876 | 1.50 | 1.88300 | 40.8 | 28.51 |
| 42 | −56.114 | | | | 29.79 |

Aspherical Surface Data

6th Surface

K = 0.00000e+000 A 4 = 1.79515e−005 A 6 = −4.32442e−008
A 8 = 8.79878e−011 A10 = −7.98746e−014

7th Surface

K = 0.00000e+000 A 4 = 6.54163e−006 A 6 = 4.63763e−009
A 8 = −6.77907e−011 A10 = 8.00478e−013

8th Surface

K = 0.00000e+000 A 4 = −3.12178e−006 A 6 = 2.99486e−009
A 8 = 8.37239e−011 A10 = −1.35083e−013

28th Surface

K = 0.00000e+000 A 4 = 7.04783e−006 A 6 = −9.97816e−009
A 8 = 1.78001e−011 A10 = −4.22406e−014

33th Surface

K = 0.00000e+000 A 4 = −4.31898e−006 A 6 = 1.01275e−008
A 8 = −6.15621e−011 A10 = 1.15671e−013

Various Data
Zoom ratio 12.14

| | Wide Angle | Intermediate | Telephoto |
|---|---|---|---|
| Focal Length | 24.30 | 100.00 | 294.99 |
| F-number | 4.10 | 5.60 | 5.89 |
| Half Angle of View (degree) | 41.68 | 12.21 | 4.19 |
| Image Height | 21.64 | 21.64 | 21.64 |
| Lens Total Length | 197.97 | 242.42 | 298.48 |
| BF | 38.89 | 91.12 | 96.32 |
| d 5 | 2.30 | 31.28 | 90.82 |
| d16 | 20.61 | 3.14 | 0.50 |
| d17 | 26.33 | 7.05 | 1.00 |
| d28 | 0.81 | 11.39 | 13.64 |
| d33 | 13.83 | 3.24 | 1.00 |
| ea17 | 14.73 | 25.38 | 29.63 |

-continued

Unit mm

Zoom Lens Unit Data

| Unit | Start Surface | Focal Length | Lens Configuration Length | Front Principal Point Position | Rear Principal Point Position |
|---|---|---|---|---|---|
| 1 | 1 | 152.70 | 17.56 | 6.92 | −4.33 |
| 2 | 6 | −19.88 | 22.96 | 1.11 | −16.29 |
| 3 | 17 | ∞ | 0.00 | 0.00 | −0.00 |
| 4 | 18 | 29.42 | 24.81 | 4.41 | −11.90 |
| 5 | 29 | −35.44 | 6.52 | 2.00 | −1.88 |
| 6 | 34 | 87.58 | 23.36 | 1.20 | −14.67 |

Numerical Example 5

Unit mm

Surface Data

| Surface Number | r | d | nd | vd | Effective Diameter |
|---|---|---|---|---|---|
| 1 | 237.559 | 2.00 | 1.88300 | 40.8 | 65.47 |
| 2 | 84.179 | 9.23 | 1.49700 | 81.5 | 62.14 |
| 3 | −652.561 | 0.15 | | | 61.89 |
| 4 | 83.688 | 7.05 | 1.59522 | 67.7 | 60.95 |
| 5 | 933.296 | (Variable) | | | 60.29 |
| 6* | ∞ | 1.60 | 1.85400 | 40.4 | 33.95 |
| 7* | 21.193 | 5.45 | | | 26.10 |
| 8 | −277.277 | 1.40 | 1.77250 | 49.6 | 25.90 |
| 9 | 144.541 | 1.64 | | | 24.84 |
| 10* | −81.185 | 1.20 | 1.76385 | 48.5 | 24.75 |
| 11 | 96.300 | 3.60 | 1.72047 | 34.7 | 24.01 |
| 12 | −48.902 | 1.76 | | | 23.65 |
| 13 | −23.407 | 1.20 | 1.59522 | 67.7 | 23.65 |
| 14 | −137.459 | 0.15 | | | 24.70 |
| 15 | 151.600 | 2.96 | 1.85478 | 24.8 | 26.03 |
| 16 | −88.806 | (Variable) | | | 26.65 |
| 17 | ∞ | (Variable) | | | (Variable) |
| 18 (Aperture Stop) | ∞ | (Variable) | | | 28.10 |
| 19 | 53.332 | 2.44 | 1.69895 | 30.1 | 29.34 |
| 20 | 90.359 | (Variable) | | | 29.48 |
| 21 | 41.807 | 4.62 | 1.59522 | 67.7 | 30.33 |
| 22 | −499.193 | 0.15 | | | 30.24 |
| 23 | 43.853 | 4.35 | 1.49700 | 81.5 | 29.90 |
| 24 | 1027.648 | 0.15 | | | 29.34 |
| 25* | 64.904 | 1.50 | 2.00100 | 29.1 | 28.69 |
| 26 | 22.379 | 6.84 | 1.56883 | 56.4 | 26.88 |
| 27 | −125.683 | (Variable) | | | 26.70 |
| 28 | −107.500 | 1.10 | 1.88300 | 40.8 | 22.14 |
| 29 | 41.771 | 0.15 | | | 22.33 |
| 30 | 36.244 | 3.57 | 1.85478 | 24.8 | 22.67 |
| 31 | −177.475 | 1.10 | 1.85400 | 40.4 | 22.76 |
| 32* | 52.720 | (Variable) | | | 22.74 |
| 33 | 51.220 | 6.58 | 1.59522 | 67.7 | 31.63 |
| 34 | −59.664 | 0.15 | | | 31.81 |
| 35 | 77.238 | 1.40 | 2.00100 | 29.1 | 31.02 |
| 36 | 21.153 | 5.17 | 1.43875 | 94.9 | 29.28 |
| 37 | 33.053 | 0.63 | | | 30.24 |
| 38 | 31.811 | 8.18 | 3.64769 | 33.8 | 31.73 |
| 39 | −82.357 | 1.88 | | | 31.93 |
| 40 | −38.721 | 1.60 | 1.88300 | 40.8 | 31.93 |
| 41 | −71.489 | | | | 33.02 |

Aspherical Surface Data

6th Surface

K = 0.00000e+000 A 4 = 1.94899e−005 A 6 = −5.58353e−008
A 8 = 1.46441e−010 A10 = −1.75111e−013

-continued

Unit mm

7th Surface

K − 0.00000e+000 A 4 = 1.06964e−005 A 6 = 5.77937e−009
A 8 = −1.27014e−010 A10 = 1.53276e−012

10th Surface

K = 0.00000e+000 A 4 = −3.46897e−006 A 6 = 9.83790e−009
A 8 = 6.81292e−012 A10 = 2.23747e−013

25th Surface

K = 0.00000e+000 A 4 = −4.64496e−006 A 6 = −3.41074e−010
A 8 = −6.55903e−013 A10 = 1.21737e−015

32th Surface

K = 0.00000e+000 A 4 = −2.77060e−006 A 6 = 5.17029e−009
A 8 = −2.00629e−011 A10 = 6.45952e−014

Various Data
Zoom ratio 12.14

|  | Wide Angle | Intermediate | Telephoto |
|---|---|---|---|
| Focal Length | 24.30 | 99.99 | 294.99 |
| F-number | 4.10 | 5.71 | 5.88 |
| Angle of View | 41.68 | 12.21 | 4.19 |
| Image Height | 21.64 | 21.64 | 21.64 |
| Lens Total Length | 198.55 | 245.71 | 298.53 |
| BF | 39.59 | 92.36 | 93.20 |
| d 5 | 2.40 | 33.70 | 94.78 |
| d16 | 17.02 | 2.13 | 0.50 |
| d17 | 17.99 | 8.46 | 1.00 |
| d18 | 10.00 | 0.00 | 0.00 |
| d20 | 3.04 | 0.55 | 0.55 |
| d27 | 1.28 | 13.76 | 16.34 |
| d32 | 16.27 | 3.78 | 1.21 |
| ea17 | 13.35 | 23.06 | 27.40 |

Zoom Lens Unit Data

| Unit | Start Surface | Focal Length | Lens Configuration Length | From Principal Point Position | Rear Principal Point Position |
|---|---|---|---|---|---|
| 1 | 1 | 155.88 | 18.44 | 7.17 | −4.64 |
| 2 | 6 | −20.75 | 20.96 | 0.85 | −15.81 |
| 3 | 17 | ∞ | 0.00 | 0.00 | −0.00 |
| 4 | 18 | ∞ | 0.00 | 0.00 | −0.00 |
| 5 | 19 | 181.31 | 2.44 | −2.01 | −3.41 |
| 6 | 21 | 37.97 | 17.61 | 1.86 | −9.61 |
| 7 | 28 | −44.99 | 5.92 | 2.14 | −1.06 |
| 8 | 33 | 81.73 | 25.60 | 0.12 | −16.62 |

Numerical Example 6

Unit mm

Surface Data

| Surface Number | r | d | nd | vd | Effective Diameter |
|---|---|---|---|---|---|
| 1 | 195.304 | 2.00 | 1.88300 | 40.8 | 64.68 |
| 2 | 75.342 | 8.70 | 1.49700 | 81.5 | 59.33 |
| 3 | −1857.425 | 0.15 |  |  | 57.57 |
| 4 | 75.332 | 6.55 | 1.59522 | 67.7 | 56.00 |
| 5 | 621.476 | (Variable) |  |  | 55.23 |
| 6* | ∞ | 1.60 | 1.85400 | 40.4 | 34.33 |
| 7* | 18.547 | 6.67 |  |  | 25.45 |
| 8 | −86.702 | 1.40 | 1.77250 | 49.6 | 25.26 |
| 9 | 563.073 | 0.80 |  |  | 24.40 |
| 10* | −237.385 | 1.20 | 1.76385 | 48.5 | 24.14 |
| 11 | 77.161 | 3.92 | 1.72047 | 34.7 | 23.35 |
| 12 | −52.932 | 2.39 |  |  | 22.74 |
| 13 | −19.676 | 1.20 | 1.59522 | 67.7 | 22.73 |
| 14 | −47.946 | 0.15 |  |  | 22.89 |
| 15 | 645.197 | 2.33 | 1.85478 | 24.8 | 24.15 |
| 16 | −83.375 | (Variable) |  |  | 24.72 |
| 17 | ∞ | (Variable) |  |  | (Variable) |
| 18 (Aperture Stop) | ∞ | (Variable) |  |  | 28.00 |
| 19 | 51.609 | 2.82 | 1.84666 | 23.8 | 27.91 |
| 20 | 155.048 | 0.15 |  |  | 27.94 |
| 21 | 36.994 | 3.21 | 1.59522 | 67.7 | 28.38 |
| 22 | 55.429 | 7.70 |  |  | 27.97 |
| 23 | 25.925 | 5.94 | 1.49700 | 81.5 | 28.01 |
| 24 | 322.349 | 0.16 |  |  | 27.15 |
| 25* | 64.301 | 1.50 | 2.00100 | 29.1 | 26.54 |
| 26 | 19.210 | 6.30 | 1.51823 | 58.9 | 24.46 |
| 27 | −414.695 | 0.15 |  |  | 24.31 |
| 28 | 124.955 | 1.10 | 1.88300 | 40.8 | 24.23 |
| 29 | 46.143 | 11.84 |  |  | 23.98 |
| 30 | 50.342 | 3.92 | 1.83481 | 42.7 | 28.57 |
| 31 | −177.113 | (Variable) |  |  | 28.53 |
| 32 | −174.378 | 2.53 | 1.59522 | 67.7 | 27.98 |
| 33 | −109.846 | 0.15 |  |  | 27.91 |
| 34 | 239.360 | 1.40 | 2.00100 | 29.1 | 27.62 |
| 35 | 19.243 | 6.22 | 1.43875 | 94.9 | 26.60 |
| 36 | 75.243 | 1.01 |  |  | 28.00 |
| 37 | 72.960 | 10.80 | 1.72151 | 29.2 | 29.54 |
| 38 | −20.375 | 1.60 | 1.85400 | 40.4 | 30.57 |
| 39* | −71.171 |  |  |  | 33.70 |

Aspherical Surface Data

6th Surface

K = 0.00000e+000 A 4 = 2.25764e−005 A 6 = −4.47930e−008
A 8 = 8.47185e−011 A10 = −8.64622e−014

7th Surface

K = 0.00000e+000 A 4 = 6.39712e−006 A 6 = 6.31243e−008
A 8 = −3.24035e−010 A10 = 2.51381e−012

10th Surface

K = 0.00000e+000 A 4 = −1.33765e−006 A 6 = 2.07345e−008
A 8 = 4.46521e−011 A10 = 5.26572e−013

25th Surface

K = 0.00000e+000 A 4 = −6.42231e−006 A 6 = 8.75690e−010
A 8 = 1.00065e−013 A10 = 1.404968−014

39th Surface

K = 0.00000e+000 A 4 = −5.02536e−006 A 6 = −1.29460e−008
A 8 = 2.87119e−011 A10 = −1.01104e−013

Various Data
Zoom ratio 8.23

|  | Wide Angle | Intermediate | Telephoto |
|---|---|---|---|
| Focal Length | 24.30 | 99.97 | 199.91 |
| F-number | 4.10 | 5.71 | 5.88 |
| Angle of View | 41.68 | 12.21 | 6.18 |
| Image Height | 21.64 | 21.64 | 21.64 |
| Lens Total Length | 194.84 | 258.91 | 298.20 |
| BF | 39.58 | 91.95 | 92.00 |
| d 5 | 2.25 | 36.62 | 77.96 |
| d16 | 16.45 | 4.77 | 0.51 |
| d17 | 14.00 | 2.34 | 1.00 |
| d18 | 14.00 | 0.00 | 0.00 |
| d31 | 1.00 | 15.89 | 19.20 |
| ea17 | 13.99 | 24.94 | 25.52 |

Zoom Lens Unit Data

| Unit | Start Surface | Focal Length | Lens Configuration Length | Front Principal Point Position | Rear Principal Point Position |
|---|---|---|---|---|---|
| 1 | 1 | 150.30 | 17.39 | 6.26 | −4.89 |
| 2 | 6 | −19.58 | 21.66 | 0.65 | −16.94 |

-continued

Unit mm

| | | | | | |
|---|---|---|---|---|---|
| 3 | 17 | ∞ | 0.00 | 0.00 | −0.00 |
| 4 | 18 | ∞ | 0.00 | 0.00 | −0.00 |

-continued

Unit mm

| | | | | | |
|---|---|---|---|---|---|
| 5 | 19 | 39.20 | 44.78 | 21.04 | −31.03 |
| 6 | 32 | −89.81 | 23.70 | −6.76 | −23.98 |

TABLE 1

| | | Numerical Example 1 | Numerical Example 2 | Numerical Example 3 |
|---|---|---|---|---|
| | Lens Unit Type | Positive Negative Positive Negative Positive | Positive Negative Positive Negative Positive | Positive Negative Positive Negative Positive |
| | fw | 24.300 | 24.300 | 24.300 |
| | ft | 294.950 | 294.970 | 294.990 |
| | f1 | 154.140 | 157.460 | 143.570 |
| | f2 | −20.260 | −22.710 | −19.460 |
| | Variator Configuration | Negative Negative Negative Positive Negative Positive | Negative Negative Positive Positive Negative Positive | Negative Negative Negative Positive Negative Positive |
| | N11 | 1.883 | 1.835 | 1.883 |
| | N12 | 1.497 | 1.497 | 1.497 |
| | N13 | 1.595 | 1.595 | 1.595 |
| | N21 | 1.854 | 1.883 | 1.854 |
| | N22 | 1.773 | 1.883 | 1.773 |
| | N23 | 1.764 | 1.855 | 1.773 |
| | N24 | 1.720 | 1.720 | 1.720 |
| | N25 | 1.595 | 1.595 | 1.595 |
| | N26 | 1.855 | 1.800 | 1.855 |
| | ν11 | 40.800 | 42.700 | 40.800 |
| | ν12 | 81.500 | 81.500 | 81.500 |
| | ν13 | 67.700 | 67.700 | 67.700 |
| | ν21 | 40.400 | 40.800 | 40.400 |
| | ν22 | 49.600 | 40.800 | 49.600 |
| | ν23 | 48.500 | 24.800 | 49.600 |
| | ν24 | 34.700 | 34.700 | 34.700 |
| | ν25 | 67.700 | 67.700 | 67.700 |
| | ν26 | 24.800 | 29.800 | 24.800 |
| | θgF11 | 0.567 | 0.565 | 0.567 |
| | θgF12 | 0.538 | 0.538 | 0.538 |
| | θgF13 | 0.544 | 0.544 | 0.544 |
| | θgF21 | 0.568 | 0.567 | 0.568 |
| | θgF22 | 0.552 | 0.567 | 0.552 |
| | θgF23 | 0.559 | 0.612 | 0.552 |
| | θgF24 | 0.583 | 0.583 | 0.583 |
| | θgF25 | 0.544 | 0.544 | 0.544 |
| | θgF26 | 0.612 | 0.602 | 0.632 |
| | f11 | −146.250 | −138.180 | −143.670 |
| | f12 | 146.410 | 144.890 | 144.320 |
| | f13 | 154.960 | 150.440 | 142.240 |
| | f21 | −25.770 | −22.900 | −25.170 |
| | f22 | −99.400 | −29.280 | −86.850 |
| | f23 | −45.470 | 68.620 | −49.140 |
| | f24 | 37.440 | 48.390 | 43.210 |
| | f25 | −45.600 | −63.550 | −50.700 |
| | f26 | 64.260 | 108.120 | 70.840 |
| | X11 | −0.008 | −0.007 | −0.008 |
| | X12 | 0.031 | 0.031 | 0.031 |
| | X13 | 0.014 | 0.014 | 0.014 |
| | X21 | −0.008 | −0.008 | −0.008 |
| | X22 | −0.008 | −0.008 | −0.008 |
| | X23 | −0.003 | 0.010 | −0.008 |
| | X24 | −0.002 | −0.002 | −0.002 |
| | X25 | 0.014 | 0.014 | 0.014 |
| | X26 | 0.010 | 0.008 | 0.010 |
| (1) Left Side | Nd − 14.3/νd − 1.264 | 0.044 | 0.014 | 0.044 |
| | | 0.014 | 0.044 | 0.014 |
| | | — | 0.056 | — |
| (1) Right Side | Nd − 16.667/νd − 1.317 | −0.077 | −0.134 | −0.077 |
| | | −0.134 | −0.077 | −0.134 |
| | | — | −0.076 | — |
| (2) | ΣXi/fi/Σ1/fi | 0.002 | 0.004 | 0.003 |
| (3) | Xni | 0.014 | 0.014 | 0.014 |
| (4) | νd | 67.700 | 67.700 | 67.700 |

TABLE 1-continued

| | | | | |
|---|---|---|---|---|
| (5) | ΣXi/fi/Σ1/fi | 0.056 | 0.057 | 0.053 |
| (6) | f1/fw | 6.343 | 6.480 | 5.908 |
| (7) | −f2/fw | 0.834 | 0.935 | 0.801 |

| | | Numerical Example 4 | Numerical Example 5 | Numerical Example 6 |
|---|---|---|---|---|
| | Lens Unit Type | Positive Negative Positive Negative Positive | Positive Negative Positive Positive Negative Positive | Positive Negative Positive Positive |
| | fw | 24.298 | 24.301 | 24.300 |
| | ft | 294.992 | 199.914 | 294.990 |
| | f1 | 155.880 | 150.303 | 143.570 |
| | f2 | −20.754 | −19.579 | −19.460 |
| | Variator Configuration | Negative Negative Positive Positive Negative Positive | Negative Negative Negative Positive Negative Positive | Negative Negative Negative Positive Negative Positive |
| | N11 | 1.883 | 1.883 | 1.883 |
| | N12 | 1.497 | 1.497 | 1.497 |
| | N13 | 1.595 | 1.595 | 1.595 |
| | N21 | 1.854 | 1.854 | 1.854 |
| | N22 | 1.773 | 1.773 | 1.773 |
| | N23 | 1.764 | 1.764 | 1.773 |
| | N24 | 1.720 | 1.720 | 1.720 |
| | N25 | 1.595 | 1.595 | 1.595 |
| | N26 | 1.855 | 1.855 | 1.855 |
| | ν11 | 40.800 | 40.800 | 40.800 |
| | ν12 | 81.500 | 81.500 | 81.500 |
| | ν13 | 67.700 | 67.700 | 67.700 |
| | ν21 | 40.400 | 40.400 | 40.400 |
| | ν22 | 49.600 | 49.600 | 49.600 |
| | ν23 | 48.500 | 48.500 | 49.600 |
| | ν24 | 34.700 | 34.700 | 34.700 |
| | ν25 | 67.700 | 67.700 | 67.700 |
| | ν26 | 24.800 | 24.800 | 24.800 |
| | θgF11 | 0.567 | 0.567 | 0.567 |
| | θgF12 | 0.538 | 0.538 | 0.538 |
| | θgF13 | 0.544 | 0.544 | 0.544 |
| | θgF21 | 0.568 | 0.568 | 0.568 |
| | θgF22 | 0.552 | 0.552 | 0.552 |
| | θgF23 | 0.559 | 0.559 | 0.552 |
| | θgF24 | 0.583 | 0.583 | 0.583 |
| | θgF25 | 0.544 | 0.544 | 0.544 |
| | θgF26 | 0.612 | 0.612 | 0.612 |
| | f11 | −148.560 | −140.010 | −143.670 |
| | f12 | 150.650 | 145.900 | 144.320 |
| | f13 | 153.970 | 143.380 | 142.240 |
| | f21 | −24.820 | −21.720 | −25.170 |
| | f22 | −122.820 | −97.170 | −86.850 |
| | f23 | −57.500 | −76.110 | −49.140 |
| | f24 | 45.490 | 44.130 | 43.210 |
| | f25 | −47.580 | −56.970 | −50.700 |
| | f26 | 65.890 | 86.510 | 70.840 |
| | X11 | −0.008 | −0.008 | −0.008 |
| | X12 | 0.031 | 0.031 | 0.031 |
| | X13 | 0.014 | 0.014 | 0.014 |
| | X21 | −0.008 | −0.008 | −0.008 |
| | X22 | −0.008 | −0.008 | −0.008 |
| | X23 | −0.003 | −0.003 | −0.008 |
| | X24 | −0.002 | −0.002 | −0.002 |
| | X25 | 0.014 | 0.014 | 0.014 |
| | X26 | 0.010 | 0.010 | 0.010 |
| (1) Left Side | Nd − 14.3/νd − 1.264 | 0.205 | 0.205 | 0.044 |
| | | 0.044 | 0.044 | 0.014 |
| | | 0.014 | 0.024 | — |
| (1) Right Side | Nd − 16.667/νd − 1.317 | 0.103 | 0.103 | −0.077 |
| | | −0.077 | −0.077 | −0.134 |
| | | −0.134 | −0.134 | — |
| (2) | ΣXi/fi/Σ1/fi | 0.008 | 0.005 | 0.003 |
| (3) | Xni | 0.014 | 0.014 | 0.014 |
| (4) | νd | 67.700 | 67.700 | 67.700 |
| (5) | ΣXi/fi/Σ1/fi | 0.055 | 0.055 | 0.053 |
| (6) | f1/fw | 6.435 | 6.185 | 5.908 |
| (7) | −f2/fw | 0.854 | 0.806 | 0.801 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-072124, filed Mar. 31, 2014 and Japanese Patent Application No. 2015-011629, filed Jan. 23, 2015 which are hereby incorporated by reference herein in their entirety.

What is claimed is:

1. A zoom lens comprising, in order from an object side to an image side: a first lens unit having a positive refractive power; a second lens unit having a negative refractive power; and a rear unit including at least one lens unit, wherein intervals between the adjacent lens units vary during zooming, and
wherein the rear unit has a positive refractive power over an entire zoom range, the second lens unit includes at least three negative lenses, and at least two positive lenses, and
all the positive lenses included in the second lens unit satisfy a conditional expression, $$1.264+14.3/vd<Nd<1.317+16.667/vd,$$

where a refractive index and an Abbe number of a material are Nd and vd, respectively.

2. The zoom lens according to claim 1, wherein the second lens unit includes at least four negative lenses.

3. The zoom lens according to claim 1, wherein the zoom lens satisfies conditional expressions, $$0.01<X2ni<0.10, \text{ and}$$

$$60<vd2ni,$$

where an Abbe number of a material of a negative lens $G2ni$ arranged at an i-th position counted from the object side among the negative lenses included in the second lens unit is $vd2ni$, a partial dispersion ratio of the material of the negative lens $G2ni$ with reference to a g-line and an F-line is $\theta gF2ni$, and $$X2ni=\theta gF2ni-0.6438+0.001682 \times vd2ni.$$

4. The zoom lens according to claim 1, wherein the first lens unit includes a plurality of lenses, and the zoom lens satisfies a conditional expression, $$0.03<(\Sigma X1j/f1j)/(\Sigma 1/f1j)<0.10,$$

where an Abbe number of a material of a lens $G1j$ at an j-th position counted from the object side among the lenses included in the first lens unit is $vd1j$, a partial dispersion ratio of the lens $G1j$ with reference to a g-line and an F-line is $\theta gF1j$, a focal length of the lens $G1j$ is $f1j$, and $$X1j=\theta gF1j-0.6438+0.001682 \times vd1j.$$

5. The zoom lens according to claim 1, wherein the zoom lens satisfies a conditional expression, $$4.0<f1/fw<8.0$$

where a focal length of the first lens unit is f1, and a focal length of an entire system at a wide angle end is fw.

6. The zoom lens according to claim 1, wherein the zoom lens satisfies a conditional expression, $$0.60<-f2/fw<1.10$$

where a focal length of the second lens unit is f2, and a focal length of an entire system at a wide angle end is fw.

7. The zoom lens according to claim 1, wherein the rear unit consists of, from the object side to the image side: a third lens unit having a positive refractive power; a fourth lens unit having a negative refractive power; and a fifth lens unit having a positive refractive power.

8. The zoom lens according to claim 7, wherein each of the lens units moves to the object side during zooming from a wide angle end to a telephoto end.

9. The zoom lens according to claim 7, wherein during zooming from a wide angle end to a telephoto end, the first lens unit and the third lens unit to the fifth lens unit move to the object side, and the second lens unit moves along a locus convex to the object side or a locus convex to the image side.

10. The zoom lens according to claim 1, wherein the rear unit consists of, from the object side to the image side: a third lens unit having a positive refractive power; a fourth lens unit having a positive refractive power; a fifth lens unit having a negative refractive power; and a sixth lens unit having a positive refractive power.

11. The zoom lens according to claim 1, wherein the rear unit consists of, from the object side to the image side: a third lens unit having a positive refractive power; and a fourth lens unit having a positive refractive power.

12. An image pickup apparatus comprising:
a zoom lens; and
an image sensor configured to receive an image formed by the zoom lens,
wherein the zoom lens comprises, in order from an object side to an image side: a first lens unit having a positive refractive power; a second lens unit having a negative refractive power; and a rear unit including at least one lens unit, wherein intervals between the adjacent lens units vary during zooming, and
wherein the rear unit has a positive refractive power over an entire zoom range, and the second lens unit includes at least three negative lenses and at least two positive lenses, and
all the positive lenses included in the second lens unit satisfy a conditional expression, $$1.264+14.3/vd<Nd<1.317+16.667/vd,$$

where a refractive index and an Abbe number of a material are Nd and vd, respectively.

13. A zoom lens comprising, in order from an object side to an image side: a first lens unit having a positive refractive power; a second lens unit having a negative refractive power; and a rear unit including at least one lens unit, wherein intervals between the adjacent lens units vary during zooming, and
wherein the rear unit has a positive refractive power over an entire zoom range, the second lens unit includes at least three negative lenses, and at least two positive lenses, and
the zoom lens satisfies a conditional expression, $$-0.010<(\Sigma X2pi/f2pi)/(\Sigma 1/f2pi)<0.008,$$

where an Abbe number of a material of a positive lens $G2pi$ arranged at an i-th position counted from the object side among the positive lenses included in the second lens unit is $vd2pi$, a partial dispersion ratio of the material of the positive lens $G2pi$ with reference to a g-line and an F-line is θgF2*pi*, a focal length of the positive lens G2*pi* is f2*pi*, and $X2pi = \theta gF2pi - 0.6438 + 0.001682 \times vd2pi.$ 14. The zoom lens according to claim 13, wherein the second lens unit includes at least four negative lenses.

15. The zoom lens according to claim 13,
wherein the zoom lens satisfies conditional expressions, $0.01 < X2ni < 0.10$, and $60 < vd2ni$, where an Abbe number of a material of a negative lens G2*ni* arranged at an i-th position counted from the object side among the negative lenses included in the second lens unit is vd2*ni*, a partial dispersion ratio of the material of the negative lens G2*ni* with reference to a g-line and an F-line is θgF2*ni*, and $X2ni = \theta gF2ni - 0.6438 + 0.001682 \times vd2ni.$ 16. The zoom lens according to claim 13,
wherein the first lens unit includes a plurality of lenses, and the zoom lens satisfies a conditional expression, $0.03 < (\Sigma X1j/f1j)/(\Sigma 1/f1j) < 0.10$, where an Abbe number of a material of a lens G1*j* at an j-th position counted from the object side among the lenses included in the first lens unit is vd1*j*, a partial dispersion ratio of the lens G1*j* with reference to a g-line and an F-line is θgF1*j*, a focal length of the lens G1*j* is f1*j*, and $X1j = \theta gF1j - 0.6438 + 0.001682 \times vd1j.$ 17. The zoom lens according to claim 13,
wherein the zoom lens satisfies a conditional expression, $4.0 < f1/fw < 8.0$ where a focal length of the first lens unit is f1, and a focal length of an entire system at a wide angle end is fw.

18. The zoom lens according to claim 13,
wherein the zoom lens satisfies a conditional expression, $0.60 < -f2/fw < 1.10$ where a focal length of the second lens unit is f2, and a focal length of an entire system at a wide angle end is fw.

19. The zoom lens according to claim 13,
wherein the rear unit consists of, from the object side to the image side: a third lens unit having a positive refractive power; a fourth lens unit having a negative refractive power; and a fifth lens unit having a positive refractive power.

20. The zoom lens according to claim 19, wherein each of the lens units moves to the object side during zooming from a wide angle end to a telephoto end.

21. The zoom lens according to claim 19, wherein during zooming from a wide angle end to a telephoto end, the first lens unit and the third lens unit to the fifth lens unit move to the object side, and the second lens unit moves along a locus convex to the object side or a locus convex to the image side.

22. The zoom lens according to claim 13, wherein the rear unit consists of, from the object side to the image side: a third lens unit having a positive refractive power; a fourth lens unit having a positive refractive power; a fifth lens unit having a negative refractive power; and a sixth lens unit having a positive refractive power.

23. The zoom lens according to claim 13, wherein the rear unit consists of, from the object side to the image side: a third lens unit having a positive refractive power; and a fourth lens unit having a positive refractive power.

24. An image pickup apparatus comprising:
a zoom lens; and
an image sensor configured to receive an image formed by the zoom lens,
wherein the zoom lens comprises, in order from an object side to an image side: a first lens unit having a positive refractive power; a second lens unit having a negative refractive power; and a rear unit including at least one lens unit, wherein intervals between the adjacent lens units vary during zooming, and
wherein the rear unit has a positive refractive power over an entire zoom range, the second lens unit includes at least three negative lenses, and at least two positive lenses, and
the zoom lens satisfies a conditional expression, $-0.010 < (\Sigma X2pi/f2pi)/(\Sigma 1/f2pi) < 0.008$, where an Abbe number of a material of a positive lens G2*pi* arranged at an i-th position counted from the object side among the positive lenses included in the second lens unit is vd2*pi*, a partial dispersion ratio of the material of the positive lens G2*pi* with reference to a g-line and an F-line is θgF2*pi*, a focal length of the positive lens G2*pi* is f2*pi*, and $X2pi = \theta gF2pi - 0.6438 + 0.001682 \times vd2pi.$

* * * * *